United States Patent
Hodges et al.

(10) Patent No.: US 7,944,086 B2
(45) Date of Patent: May 17, 2011

(54) SYSTEM AND METHOD FOR LOAD CONTROL

(75) Inventors: Joseph W. Hodges, Bloomfield Hills, MI (US); J. Anthony Sopuch, Sylvan Lake, MI (US); Richard J. Hodges, Plymouth, MI (US); Thomas D. Lasky, Bloomfield Hills, MI (US)

(73) Assignee: Hammerhead International, LLC, Bloomfield Hills, MI (US)

( * ) Notice: Subject to any disclaimer, the term of this patent is extended or adjusted under 35 U.S.C. 154(b) by 0 days.

(21) Appl. No.: 12/494,155

(22) Filed: Jun. 29, 2009

(65) Prior Publication Data

US 2009/0295226 A1 Dec. 3, 2009

Related U.S. Application Data

(63) Continuation-in-part of application No. 11/875,554, filed on Oct. 19, 2007, now Pat. No. 7,800,251.

(60) Provisional application No. 60/980,987, filed on Oct. 18, 2007.

(51) Int. Cl.
*H02J 3/00* (2006.01)
(52) U.S. Cl. ............... 307/31; 307/38; 307/39; 307/126
(58) Field of Classification Search .............. 307/38–41, 307/125, 126, 130, 140, 31–35, 134, 24; 340/654–656, 644, 573.1, 693.3, 635
See application file for complete search history.

(56) References Cited

U.S. PATENT DOCUMENTS

| | | | | |
|---|---|---|---|---|
| 5,598,042 A * | 1/1997 | Mix et al. | | 307/116 |
| 5,760,491 A * | 6/1998 | Kalin | | 307/125 |
| 5,905,442 A * | 5/1999 | Mosebrook et al. | | 340/3.7 |
| 6,028,373 A * | 2/2000 | Kim et al. | | 307/31 |
| 6,750,781 B1 * | 6/2004 | Kim | | 340/825.69 |
| 7,800,251 B2 * | 9/2010 | Hodges et al. | | 307/126 |
| 7,821,161 B2 * | 10/2010 | Beckman | | 307/126 |
| 2005/0052249 A1 * | 3/2005 | Gan et al. | | 331/23 |
| 2005/0180084 A1 * | 8/2005 | Rober et al. | | 361/154 |
| 2006/0175903 A1 * | 8/2006 | Palmer et al. | | 307/39 |
| 2006/0273663 A1 * | 12/2006 | Emalfarb | | 307/126 |
| 2010/0280671 A1 * | 11/2010 | Lee | | 307/126 |
| 2010/0295371 A1 * | 11/2010 | Lee et al. | | 307/41 |

* cited by examiner

*Primary Examiner* — Fritz M Fleming

(74) *Attorney, Agent, or Firm* — Daniel J. Henry

(57) ABSTRACT

A system is described including a master power saving device configured for connection with a master load. The master power saving device is configured to determine when the master load is in an operating condition and a non-operating condition, and the master power saving device provides non-continuous power to the master load when the master load is in a non-operating condition. A slave power saving device is configured for connection with a slave load. The slave power saving device is configured to receive a signal from the master power saving device to turn off said slave load.

13 Claims, 20 Drawing Sheets

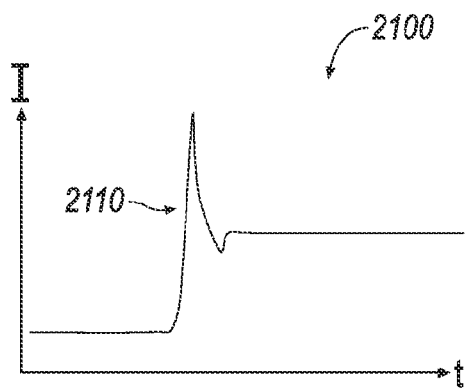
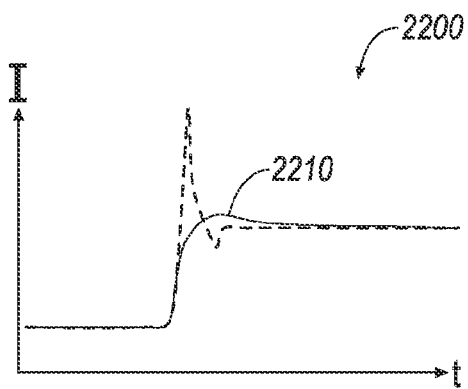
FIG. 21  FIG. 22
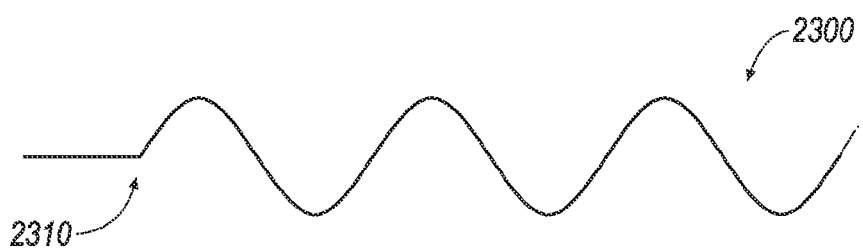
FIG. 23A
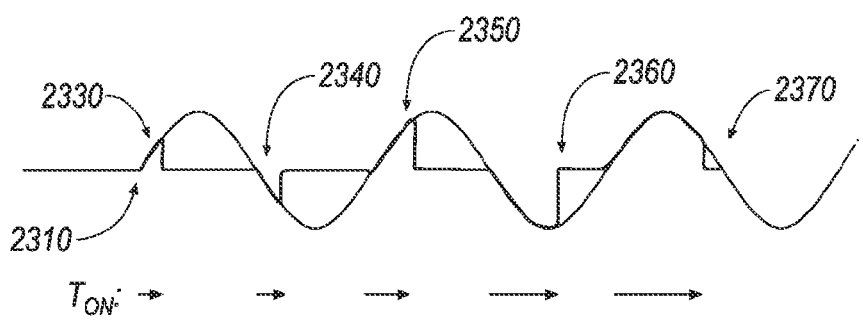
FIG. 23B

SYSTEM AND METHOD FOR LOAD CONTROL

CROSS REFERENCE TO RELATED APPLICATION

This application is a Continuation in Part of U.S. patent application Ser. No. 11/875,554, filed on Oct. 19, 2007, titled "SYSTEM AND METHOD FOR LOAD CONTROL" which in turn claims priority to U.S. Provisional Patent Application No. 60/980,987 filed on Oct. 18, 2007, titled "SYSTEM AND METHOD FOR LOAD CONTROL", to Joseph W. Hodges et al., all of which are incorporated herein by reference.

TECHNICAL FIELD

The embodiments described herein are generally directed to control of an electrical load.

BACKGROUND

Many electrical devices that utilize a plug-in power source (e.g., household power connection) consume energy while switched off and not in use. This is primarily due to a transformer or power supply that remains connected to the power source even during periods of inactivity. One common method of powering these electrical devices includes a step-down transformer with a regulator. Common examples of such devices include mobile phone chargers, VCRs, televisions, stereos, computers, and kitchen appliances.

The devices that remain powered waste energy through their transformers and/or power supplies that remain connected to the power source. Such power loss is commonly referred to as a phantom power load because the power consumption does not serve a purpose. The electrical device or appliance is typically in a standby state or otherwise inactive when drawing current and is not serving a useful function. In aggregate, a large number of phantom loads contribute to a significant portion of essentially wasted power.

One method of preventing a phantom load is to physically unplug an appliance from the electrical outlet when it is not in use. This completely disconnects the appliance from the power source and eliminates phantom loading. However, the user then must manually plug in the load when load-use is desired and then unplug the load when use is no longer desired. Such ongoing plugging-in and unplugging may be a time consuming task as well as increase wear and tear on the electrical outlet, plug, and wiring to the load.

Consequently, there is a need to reduce the amount of power consumption from loads that are not in use to reduce energy waste. More generally, there is a need to selectively control a load based on the behavior of the load itself.

BRIEF DESCRIPTION OF THE DRAWINGS

The features and inventive aspects will become more apparent upon reading the following detailed description, claims, and drawings, of which the following is a brief description:

FIG. 21 is an example of an inrush waveform.

FIG. 22 is an example of a soft start waveform in comparison with an inrush waveform.

FIG. 23A is an example of a typical AC power supply waveform.

FIG. 23B is an example of gradual clipping of an AC power supply waveform to achieve a soft start.

DETAILED DESCRIPTION

Figure 1:
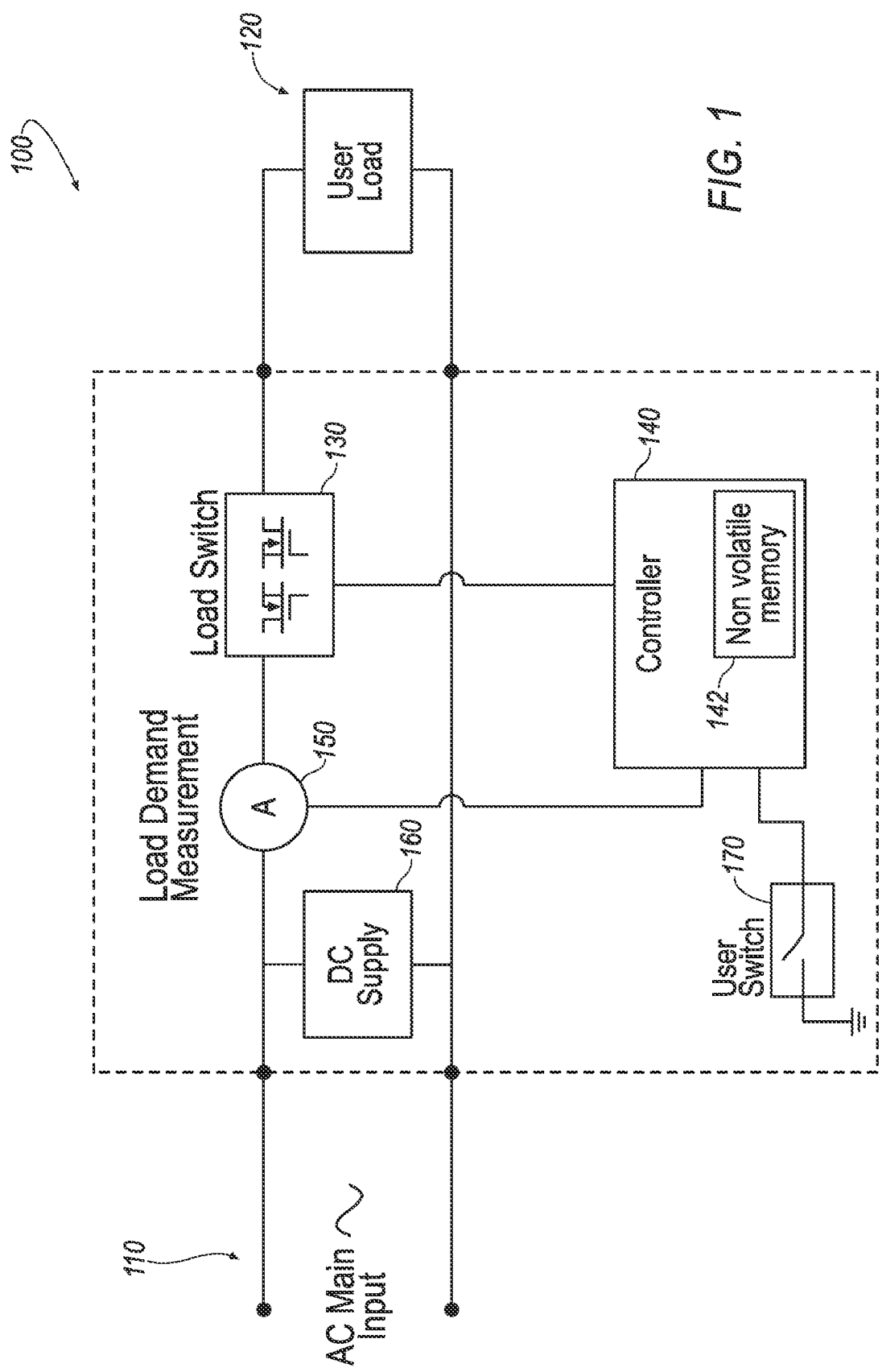
FIG. 1 is a block diagram of an energy saving device.

Referring now to the drawings, illustrative embodiments are shown in detail. Although the drawings represent the embodiments, the drawings are not necessarily to scale and certain features may be exaggerated to better illustrate and explain novel aspects of an embodiment. Further, the embodiments described herein are not intended to be exhaustive or otherwise limit or restrict the claims to the precise form and configuration shown in the drawings and disclosed in the following detailed description.

This application is a Continuation in Part of U.S. patent application Ser. No. 11/875,554, filed on Oct. 19, 2007, titled "SYSTEM AND METHOD FOR LOAD CONTROL" which in turn claims priority to U.S. Provisional Patent Application No. 60/980,987 filed on Oct. 18, 2007, titled "SYSTEM AND METHOD FOR LOAD CONTROL", to Joseph W. Hodges et al., all of which are incorporated herein by reference.

An example of a device including a system and method of load control may be an energy saving device that removes power to a load when the load is not performing a useful function. In this way, phantom load power is reduced. When the load is performing a useful function, power is supplied normally until a phantom load is detected, at which time the load is disconnected from the power source. One example of such a load is a household appliance that may not serve a useful purpose when a user does not require it to function, for example a television or a phone charger. When a television is not turned on, it is still drawing a phantom load current to power the internal transformer and/or power supply circuitry. However, the energy saving device discussed herein would interrupt the television's power input when the television is not in use. This interruption of the power input substantially eliminates the phantom load because the transformer or power supply electronics of the television are substantially un-powered and not drawing current.

An example of an energy saving device may include a measurement means, a switch means, and a logic means. The measurement means may be configured to detect current or power flowing to a load from a power source. The switch means may selectively connect and disconnect the load from the power source. The logic means determines when to connect and disconnect the load from the power source. In one example, the logic means determines whether the load is "active" or "inactive" depending upon the current or power consumption as read by the measurement means.

The logic means determines the state of the load by measuring the current that the load consumes. To make a determination whether the load is "active" or "inactive", the logic means compares the current the load is consuming to a threshold. The threshold may be predetermined value or it may be determined after the energy saving device is connected to the load (e.g., using a learning mode to define and/or characterize the load power usage). When the energy saving device uses a modifiable threshold, the value may be tuned for each load connected thereto. Such an adaptive system may be used where a large number of different loads could be connected to a single type of energy saving device. For example, household appliances may consume a wide variety of power in the "active" and "inactive" states depending upon the particular appliance (e.g., a television, a radio, a phone charger) and/or circuit design used therein. The energy saving device may then adapt to the attached load.

Each load may have a preferred threshold that the logic means uses to determine "active" and "inactive" states. This threshold may be determined by the energy saving device for each load connected to it and thus, an adaptable system may be used to allow for a variety of loads to be switched by a single variety of energy saving devices. One method of adaptive learning of the threshold includes recording current usage over a predetermined time (e.g., 24 hours). In the learning mode, the load is maintained in a fully powered state so that the logic means can record the power usage. When the predetermined learning time has elapsed, a threshold can be set between the minimum and maximum currents recorded during the learning mode. If no variation or minimal variation is noted in the recoded current measurement data, then a default threshold may be used.

Once the threshold is saved, the energy saving device logic means momentarily turns the load on to measure the current consumption. The logic means then compares the current consumption with the threshold. If the current consumption is greater than the threshold, the logic means deems the load in the "active" state and maintains power to the load. If the current consumption is less than the threshold, the logic means deems the load in the "inactive" state and power to the load is switched off. If the load is in the inactive state, the logic means occasionally (e.g., periodically) powers the load and repeats the above test to determine the desired power state of the load as a function of the load's demand behavior.

By disconnecting the load from the power source when the load is inactive, the amount of phantom current is reduced. Energy conservation is realized when the load is disconnected from the power source during times of inactivity. Power may be supplied to the load at predetermined intervals (e.g., approximately 400 ms every 2 seconds) to check the load state. This may be called the "power duty cycle" which indicates how often and for how long the load is powered for checking the active/inactive state. The power duty cycle may be determined at the point of manufacture (e.g., stored in non-volatile memory) or it may be adaptable depending upon the load (and optionally a user input such as a pushbutton).

In general, during "power cycling" the energy conservation device measures current consumption at times when power is applied to the load. If the current consumed by the load is above the threshold, the load is deemed in a "power on request" state. In this case, power cycling stops and power is applied to the load continuously. This is the normal "on" operating state of the load, and power is not cycled. During the normal operating state of the load, supplied current is monitored continuously. If the current is measured below the threshold, the load is determined to have changed to the standby state. In this event, the power cycling condition resumes to conserve energy once again.

Generally discussed herein is a system that includes a means for receiving a potential and selectively supplying said potential to a load. This receiving and supplying means may be configured as a switching element that receives a voltage from a power source, such as from a standard power receptacle as is found in a house or other structures. The receiving and supplying means is also responsive to a load control signal to supply said potential to the load when the load control signal is present. The system also includes a means for measuring a load demand where the load demand may include a current, voltage, power, or other measurement of load activity, power demand, or consumption. The system may further include a means for controlling the receiving and supplying means. The controlling means continuously providing the load control signal when the load demand is greater than a predetermined threshold. The controlling means may also temporarily provide the load control signal to determine the load demand when the load demand is less than the predetermined threshold.

Another example as discussed herein is an electrical device that includes a switch responsive to a switching signal. The switch has a input for receiving power and an output for connection to a load. A sensor may measure an electrical demand to the load which may include a current, voltage, power, or other measurement of load activity, power demand, or consumption. A controller selectively provides the switching signal. The controller provides the switching signal to power the load when the electrical demand is greater than a predetermined threshold. The controller momentarily providing the switching signal to power the load after a delay to determine the electrical demand after the delay.

Also discussed herein is a method for controlling an electrical load. The method includes determining a load demand.

The load demand may include a current, voltage, power, or other measurement of load activity, power demand, or consumption. The method further includes provisioning power to the load when the load demand is greater than a first threshold. The method also includes removing power to the load when the load demand is less than a second threshold.

FIG. 1 is an example block diagram of an energy saving device 100. A pair of Inputs 110 are configured for receiving a voltage from a power source. A load 120 is connected to outputs that are selectively switched to inputs 110 by a load switch 130. A controller 140 uses an activation signal to load switch 130 to selectively supply power to load 120 from inputs 110. Controller 140 may base the activation signal on a number of inputs, including a load sensor 150 and/or a user switch 170. Additionally, controller 140 may include a memory 142 that provides for non-volatile storage of operating parameters of energy saving device 100.

In an example, inputs 110 may be configured to interface with typical power infrastructures that may include standardized power distribution systems. One example includes the United States' standard "household power" that operates at around 120 volts AC at 60 Hz. Alternatively, other voltages and frequencies may be used including typical 220 volts at 50 Hz or 60 Hz. Indeed, energy saving device 100 should not be limited to household-type electrical connections, as it may also be employed in a variety of circumstances including mobile loads, industrial, automotive, etc. For example, energy saving device 100 may be applied to 120 volts AC at 60 Hz, 220 volts AC at 60 Hz, 220 volts AC at 50 Hz, 480 volts AC, 660 volts etc. Thus, energy saving device 100 may be adapted for use with power infrastructures around the world (both in voltage and in frequency), including but not limited to, household, industrial, mobile equipment, etc. Other examples may include applications such as aircraft, motor yachts, mobile homes, and automobiles, etc., where power for non-essential electrical systems and devices (e.g., infotainment or communications systems for passengers) may not require constant powering. Thus, in power-conscious applications energy saving device 100 may generally reduce the steady-state load on the power systems which may reduce operating costs, equipment costs, and/or maintenance costs.

As shown herein, a power supply 160 provides power for the operation of controller 140 and the associated electronics such as load sensor 150 and load switch 130. Power supply 160 may be configured so that energy is not wasted in the powering of controller 140. In another example, power supply 160 may include a battery that is rechargeable and/or user replaceable. Such a battery configuration would not necessitate power drawn from inputs 110 to provide power to energy saving device 100.

Load sensor 150 may include a current measurement sensing topology that may include a high-side resistive differential amplifier (explained below in detail with respect to FIG. 2). Such a system typically implements a resistor in series between inputs 110 and load 120 such that the voltage drop across the series resistor is measured to determine current flowing to load 120. The measured current to load 120 may be sent to controller 140 at an analog to digital converter (ADC) input or an analog comparator input. Alternative implementations may include a hall-effect sensor to measure current directly flowing from inputs 110 to load 120. In yet another example, a current measurement system may be integral with load switch 130 (such as a sense-FET). Moreover, power measurements or other means may be employed to determine whether load 120 is in use.

In operation, controller 140 may occasionally power load 120 to determine whether load 120 is to be activated continuously. If load 120 demands a relatively large current (e.g., as detected by load sensor 150), then load 120 is allowed to remain powered by continued activation of load switch 130. If load 120 demands a relatively small current, then load 120 is deactivated by turning off load switch 130. In this way, controller 140 uses load sensor 150 to determine the active or inactive status of load 120. By not continuously powering load 120, a power savings is realized through the momentary powering scheme when load 120 is turned off and not demanding a relatively large current.

User switch 170 may be used to override the operation of controller 140 to power the load based on a user request. For example, if the user believes that energy saving device 100 should power load 120, user switch 170 may be activated to immediately power load 120. User switch 170 may also be used by controller 140 as a training input. For example, if the user connects an arbitrary load to energy saving device 100 with different characteristics than the previously trained load 120, then the user may press user switch 170 to activate load 120 and signal to controller 140 that a training mode should be re-entered (explained below in detail with respect to FIG. 3).

Memory 142 may be embodied as a Flash memory, an Electrically Erasable Programmable Read-Only Memory (EEPROM) memory, or other non-volatile memory that retains information when un-powered. Typical information stored in memory 142 may include statistical information related to the operation of load 120 based on measurements from load sensor 150. Alternatively, memory 142 may include general parameter information that defines operational characteristics of controller 140.

In general, the block diagram shown herein is not to be interpreted as the only example of how to configure energy saving device 100. Indeed, in some circumstances, controller 140 may be replaced by sequential logic circuitry, analog circuitry, or a combination of both. Moreover, as is known to those skilled in the art, measurement of load 120 using load sensor 150 may include current, voltage, or power measurements depending upon the configuration. Thus, the current measurement technique for determining load consumption as discussed herein is not the only means to measure load activity and load demand. Similarly, load switch 130 may be configured using variations of components such as a field-effect transistor (FET), Triode for Alternating Current (TRIAC), zero-crossing switches, or other switching means to control load 120.

Figure 2:
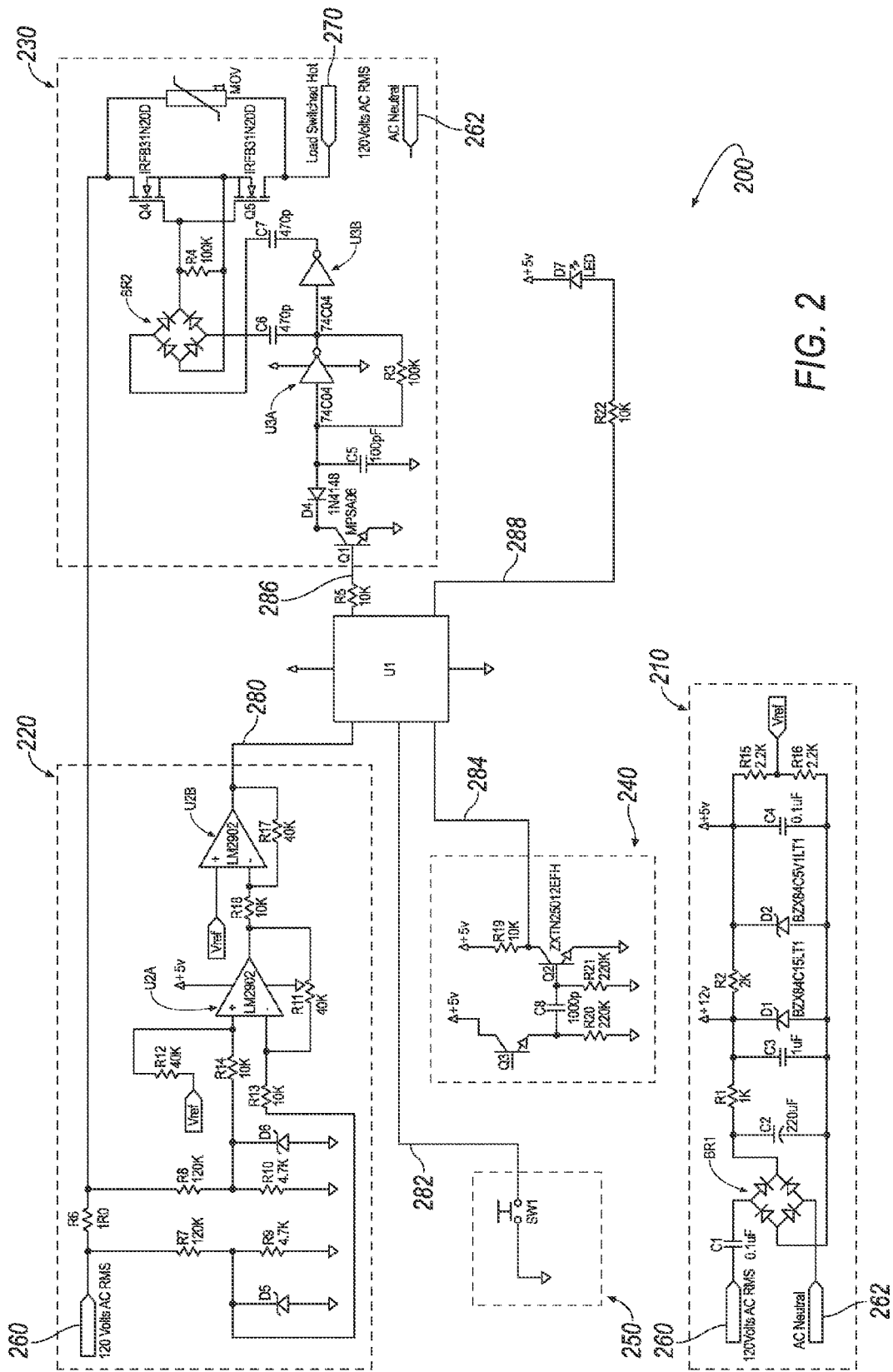
FIG. 2 is a schematic of an example of the energy saving device of FIG. 1.

FIG. 2 is a schematic of an example of an energy saving device 200. A power supply block 210 is connected to a power input 260 and a common terminal 262. A sensor block 220 measures the load current and a load switch block 230 generally controls the flow of power from power input 260 to a load output 270. Load output 270 may be directly attached to the power input to load 120 (shown in FIG. 1). While not necessary for operation, user switch 250 provides for immediate activation of a load. Moreover, an infrared sensor block 240 may be used to determine the operation of a user remote control, which requests immediate powering the load. This is used, for example, when a remote control is used to turn on a television. In this example, infrared sensor block 240 detects use of the remote and then the logic immediately turns on the television.

Power supply block 210 includes a capacitive power supply topology for low power operation. Power supply block 210 regulates a dual voltage supply to about 12 volts and about 5 volts. A bridge rectifier BR1 is used to rectify the alternating current (AC) from power input 260 and common terminal 262. Zener diodes (D1, D2) and a capacitor network (C2, C3, C4) generally regulate the voltage. In addition to supplying power to energy saving device 200, power supply block 210 also provides a voltage reference (Vref) for use with the current detection circuitry.

Sensor block 220 includes a series resistor R6 that is configured as a low-value resistor with a high power rating. For example, series resistor R6 may be a one-ohm resistor rated for 200 watts of power. A differential amplifier configuration is used that includes U2A, U2B, and Vref (from power supply block 210) to measure the current flowing through series resistor R6 to a load connected to load output 270. A load signal 280 is provided to controller U1 that contains control logic for operating load switch block 230. Controller U1 may be configured to receive load signal 280 at an analog to digital converter (ADC) input to convert the analog signal to a numeric value. In general, load signal 280 indicates to controller U1 the amount of current or power being consumed/demanded by the electrical load connected to load output 270. The load consumed by the circuitry described in the schematic of FIG. 2 does not draw power through sense resistor R6. Thus, any power consumed by the circuitry shown herein is not included in the load demand value indicated by load signal 280.

Although shown herein as a single-range sensing scheme with a single output of load signal 280, sensor block 220 may also include multiple ranges of sensed current. For example, a second load signal (not shown) may be measured by controller U1 provided by a signal at the output of amplifier U2A. Thus, controller U1 would then be able to detect current over two ranges provided by the outputs of both U2A and U2B, which would be connected to separate ADC inputs of U1. Alternative examples may also include a low-side measurement scheme or a Hall-effect load measurement scheme.

Figure 3:
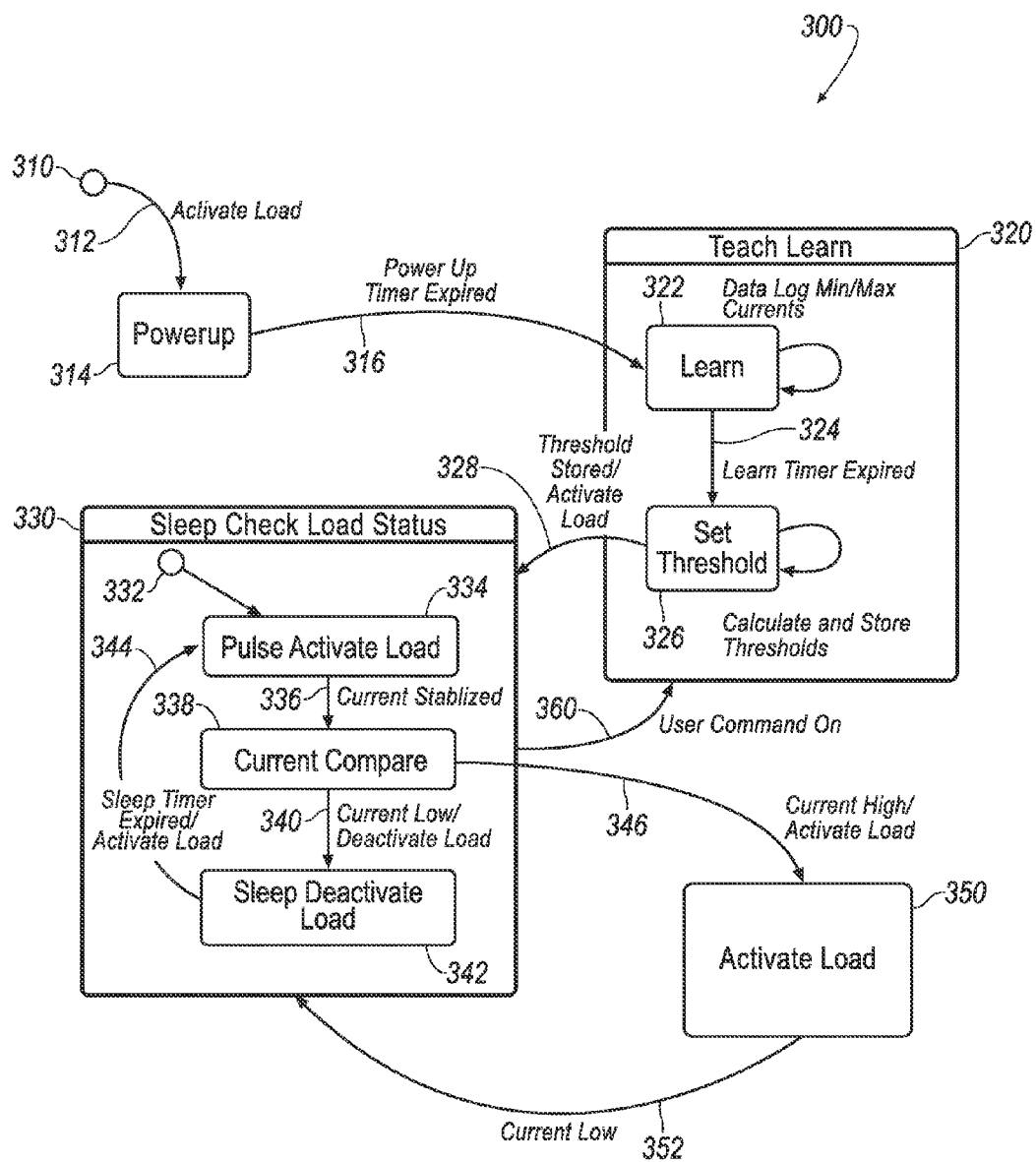
FIG. 3 is a state transition diagram for use with the energy saving device of FIG. 2.

Controller U1, in an example, may be configured as a micro-controller capable of performing the actions detailed in FIG. 3. Examples of micro-controllers known to those skilled in the art may include, for example, PIC™ micro-controllers from Microchip™, or AVR™ micro-controllers from Atmel™. For compact designs, the example shown herein includes a relatively small device that may have eight pins. However, energy saving device 200 may include other features not detailed herein, including radio frequency reception for further intelligent control of a load. Moreover, micro-controller U1 may control more than one load based on a single sensor block 220, or more than one sensor block 220. Thus, controller U1 may be scaled up or down in capabilities depending upon the measurement and control requirements for a particular application.

Load switch block 230 includes a FET driver circuit for controlling power to a load connected to load output 270. The load (as shown in FIG. 1 as load 120) is electrically connected to load output 270 and common terminal 262. A load control signal 286 is provided by controller U1 to control load switch block 230. Load switch block 230 activates (powers) or deactivates (disconnects) a load (e.g., a device or appliance) connected to load output 270. Load switch block 230 generally includes a charge pump, including U3A and U3B, that drives a bridge rectifier BR2 that in turn drives FETs Q4 and Q5. A Metal Oxide Varistor (MOV) is included to protect the relatively sensitive FETs Q4 and Q5 when the load connected at load output 270 is switched off. The MOV may also perform a secondary function as a surge suppressor for potentially damaging signals present at power input 260.

An additional feature may include a user output signal 288 from controller U1 that switches a LED D7. Output signal 288 may be used to indicate an operating status (e.g., load on or off) of energy saving device 200 to the user. Alternatively, output signal 288 may indicate that energy saving device 200 is in a learning mode (discussed below in detail with respect to FIG. 3) or whether an abnormal load condition exists that may require turning off the load to preserve the electronics.

Other examples of inputs that may trigger controller 140 to turn on load 120 (similar to infrared sensor block 240 and user switch 250) may include a general radio frequency input, a network input (such as a LAN or WiFi), digital information transmitted over the power line at power input 260, and/or signals designed for intelligent control of electrical devices, etc.

FIG. 3 is a state transition diagram 300 for use with energy saving device 200 of FIG. 2. Initial entry point 310 leads to an activate load transition 312. A typical event for energy saving device 100 to enter initial entry point 310 is when the unit is plugged into a power source. A power up mode 314 is then entered where the load is powered for a predetermined delay time. Typically, a timer/counter is used in conjunction with controller 140 (see FIG. 1). When the delay has elapsed, a power up timer expired transition 316 transfers to a teach/learn state 320.

Initial entry to teach/learn state 320 transitions to a learn state 322 where controller 140 measures the current (electrical demand) used by the load over a predetermined amount of time. Here, controller 140 determines the behavior of the load over a number of on and off cycles. By examining the load behavior, the controller may determine when the load is in use by the pattern of "load active" current consumption and "load inactive" current consumption (explained in detail below with respect to FIG. 4).

Controller 140 remains in learn state 322 until a learn timer expired transition 324 transfers control to a set threshold state 326. Controller 140 then calculates an appropriate threshold to distinguish the load "active" and "inactive" states. When the threshold has been determined, a threshold stored/activate load transition 288 transfers control to a sleep check load status state 330. Threshold stored/activate load transition 288 generally indicates that the threshold has been stored in memory (which may include a non-volatile memory such as memory 142 of FIG. 1).

Alternatively, the threshold may be a hard-coded value placed in non-volatile memory during manufacturing. Another alternative may provide a table of hard-coded threshold values. If the threshold does not suit the particular load connected, the user may push user switch 170 (shown in FIG. 1) to indicate to the controller that the current threshold is not functioning as desired. The controller may then select another threshold value from the table using, for example, a bisection algorithm to locate the appropriate threshold value for the load to reduce required user interaction.

Sleep check load status state 330 has an initial entry point 332 which immediately transfers control to a pulse activate load state 334. Pulse activate load state 334 activates the load and waits for a predetermined time for the current signal to stabilize. A current stabilized transition 336 transfers control to a current compare state 338 where the current measured through the load is compared to the threshold determined in set threshold state 326. If the current measured through the load is greater than the threshold, a current high activate load transition 346 transfers control to an activate load state 350.

Alternatively, if the current measured through the load is less than the threshold, a current low deactivate load transition 340 transfers control to a sleep deactivate load state 342 where the load is deactivated. In sleep deactivate load state 342, a timer may be monitored to determine when a predetermined sleep time has elapsed. When the predetermined sleep time has elapsed, a sleep timer expired activate load transition 344 transfers control back to pulse activate load state 334. As can be determined from sleep check load status state 330, the controller may repeat a cycle where the load is measured for significant use or insignificant use. When a current is measured that is greater than the threshold, the load is turned on. Similarly, when a current is measured that is less than the threshold, the load is turned off. Also noted is that controller 140 may include hysteresis for the threshold value in the on-to-off and off-to-on transitions to avoid oscillation and/or undesirable activation and deactivation.

In activate load state 350, the controller monitors the current for a transition to a low current consumption state of the load. When a current is measured less than the threshold determined in set threshold state 326, then current is turned off to the load. A current low transition 352 is then triggered and control proceeds to entry point 332 and pulse activate load state 334.

Figure 4:
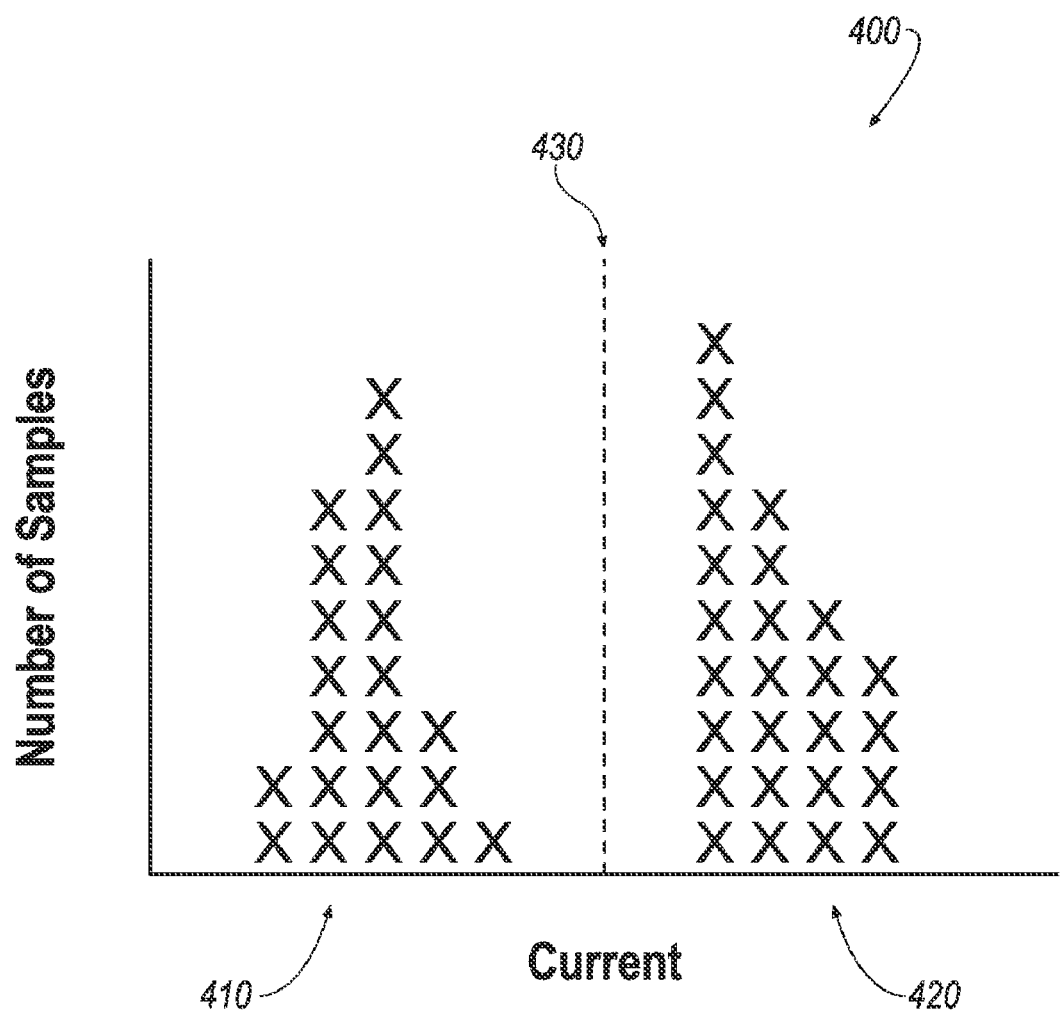
FIG. 4 is a histogram classification graph for determining active and inactive states of the load of FIGS. 1 and 2.

FIG. 4 is an example of a histogram classification graph 400 for determining active and inactive states of load 120 of FIGS. 1 and 2. During learn state 322 of teach/learn state 320 (described in detail with respect to FIG. 3), the controller monitors the usage of the load to collect information. As shown in the chart, current magnitude is measured over time to develop two distinct regions. On the right hand side of the chart, an active state 420 is indicated by a large number of samples. Similarly, a large number of samples on the left hand side of the chart indicate an inactive state 410. When the controller has collected enough information, or a timer has expired, then the microcontroller transfers control to set threshold state 326.

A threshold 430 may be determined in a number of manners. However, many loads exhibit dramatic differences in load demand behavior when inactive and active. Thus, for many applications the simple classification problem of the active and inactive states is solved by determining the average difference between clusters of measurements. These clusters of measured current, in this example, are shown by the two distinct measured current regions for inactive state 410 and active state 420. Although not shown, threshold 430 may include hysteresis that would substantially prevent undesirable switching of the load.

Figure 5:
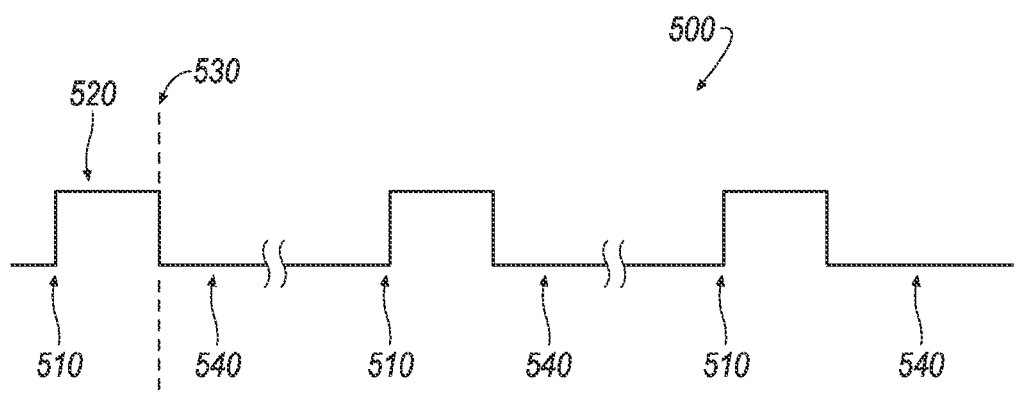
FIG. 5 is a timing diagram for activation of the load of FIGS. 1 and 2.

FIG. 5 is a timing diagram 500 for activation of load 120 of FIGS. 1 and 2. Timing diagram 500 generally refers to the sequence of applying power and removing power during sleep check load status state 330 of FIG. 3. At an activation time 510, load 120 (of FIG. 1) is provided power based on sleep timer expired activate load transition 344 to pulse activate load state 334 of FIG. 3.

A load activation time 520 allows controller 140 to determine whether load 120 is desired to be fully powered. In general, load activation time 520 includes the logic processes of current stabilized transition 336 and current compare state 338 of FIG. 3. A decision time 530 indicates that controller 140 is testing the current measured by load sensor 150 (of FIG. 1) against threshold 430 (of FIG. 4). At decision time 530, load 120 is deactivated because the current measured is less than threshold 430. Load 120 is then deactivated during an inactive time 540. Further repetitions of activation time 510 and inactive time 540 demonstrate that load 120 is continuously demanding current less than threshold 430. Although timing diagram 500 shows a periodic interval for activation time 510 and inactive time 540, it is also possible to configure each timing sequence with a non-periodic time such that some activations and/or deactivations are not equally spaced in time. For example, if the current measured is close to threshold 430, controller 140 may reduce the time between checking for activation and deactivation in an attempt to more closely monitor load demand.

Figure 6:
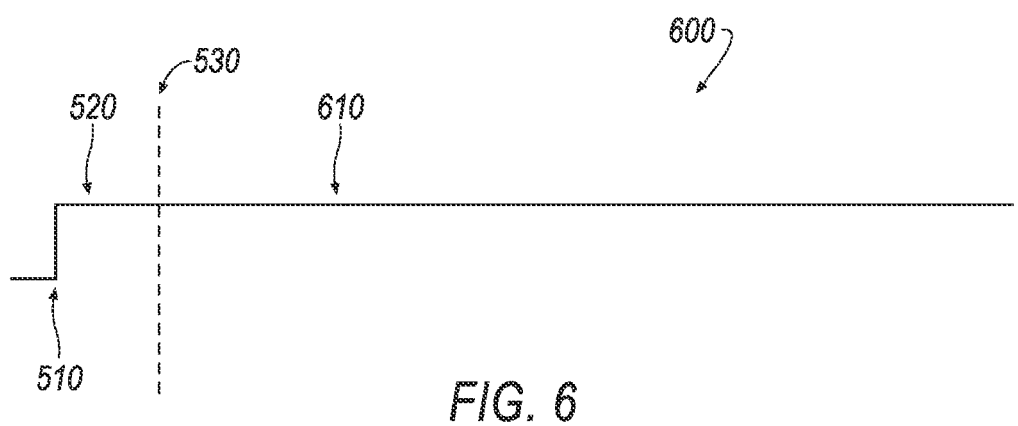
FIG. 6 is a timing diagram for sensing and switching on the load of FIGS. 1 and 2.

FIG. 6 is a timing diagram 600 for sensing and switching load 120 of FIGS. 1 and 2. In this example, activation time 510 powers load 120 for a load activation time 520. Then, at decision time 530 it is determined that load 120 is consuming a current greater than threshold 430. After the determination (corresponding to current high activate load transition 346 of FIG. 3), load 120 remains active for a load active time 610 that includes activate load state 350. Load 120 will remain active until a current low transition 352 is triggered by the current to load 120 dropping below threshold 430 (not shown in FIG. 6).

Figure 7:
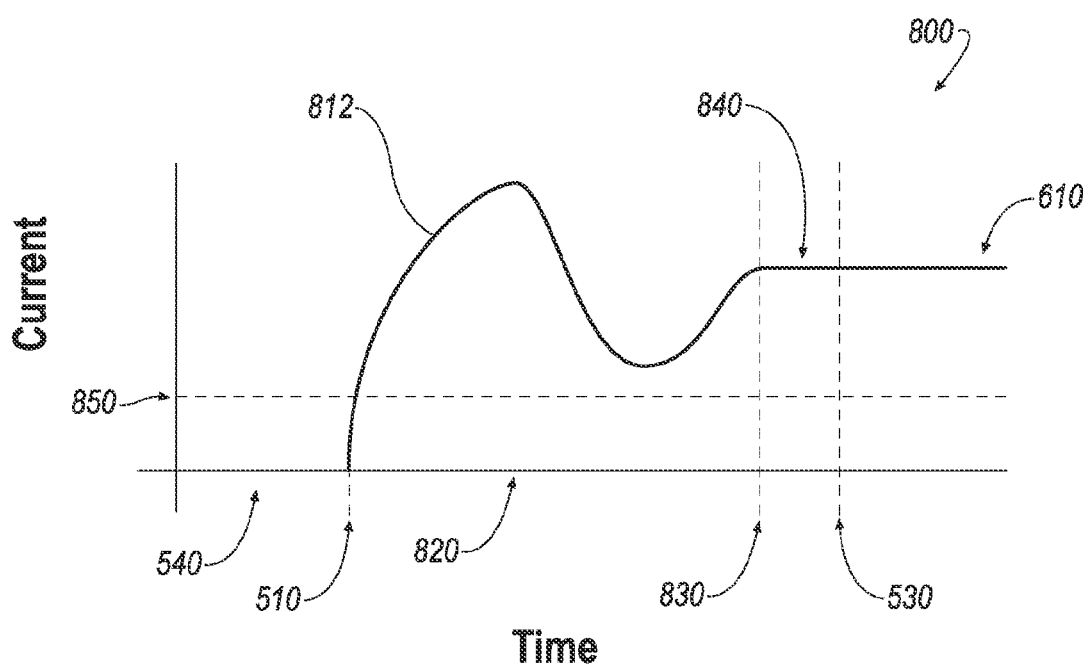
FIG. 7 is a current vs. time chart of load sensing when the load is active.

FIG. 7 is a current vs. time chart 800 of load sensing when load 120 is active. In this example, the current as measured by load sensor 150 (shown in FIG. 1) is shown in an analog chart form. At inactive time 540 (shown in FIG. 5) substantially no current is flowing to load 120. However, at activation time 510, a ramp up of current 812 indicates that load 120 is demanding current flow. During a stabilization period 820, the current flow may oscillate or otherwise behave unpredictably due to the unknown nature of load 120. It is during stabilization period 820 that load 120 receives full power to initialize the systems (if logic based) or otherwise transition to a fully powered state. At a stabilization end time 830, a sampling window 840 is used to sample the load current. At this time, one or more samples are taken from load sensor 150 to determine whether load 120 is drawing more current than threshold 430. As shown at decision time 530, load 120 remains active because the current to load 120 is greater than threshold 430. Therefore, load 120 remains active for load active time 610.

Figure 8:
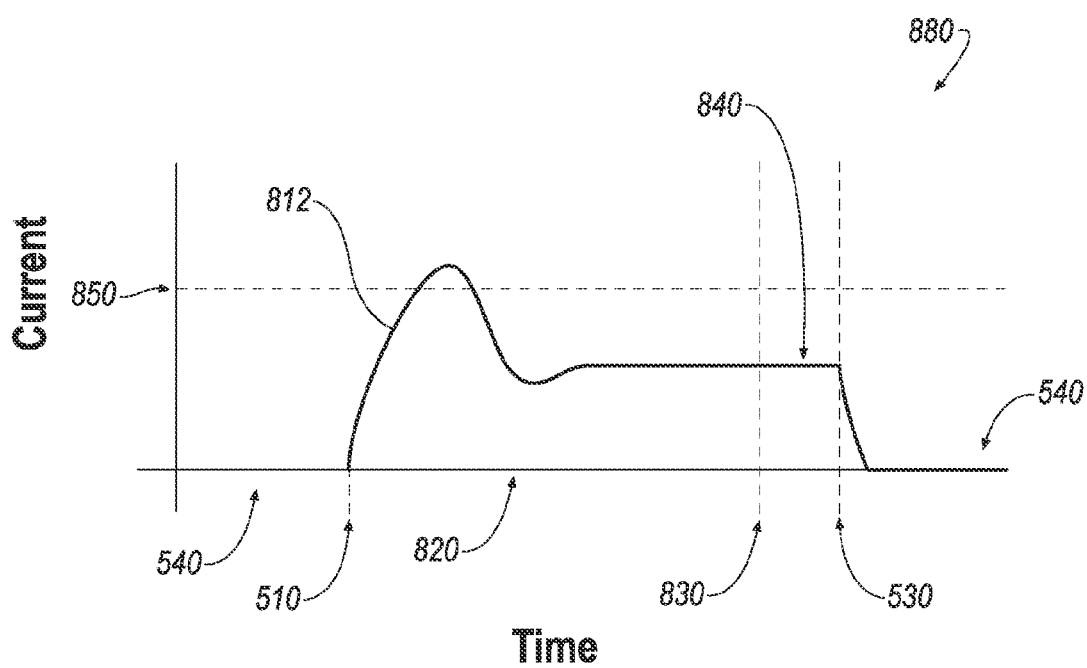
FIG. 8 is a current vs. time chart of load sensing when the load is inactive.

FIG. 8 is a current vs. time chart 880 of load sensing when load 120 is inactive. Here, the current as measured by load sensor 150 (shown in FIG. 1) is shown in an analog chart form with a slightly higher zoom factor when compared with FIG. 7 (although the figures are not to scale). At inactive time 540 (shown in FIG. 5), substantially no current is flowing to load 120. At activation time 510, a ramp up of current 812 indicates that load 120 is demanding current flow. During a stabilization period 820, the current flow oscillates but does not oscillate to the extent as shown in FIG. 7. At a stabilization end time 830, sampling window 840 is used to sample the load current. At decision time 530, load 120 is deactivated because the current demand is less than threshold 430. Load 120 will remain inactive for inactive time 540 until the next activation time 510 or a user activation.

Figure 9:
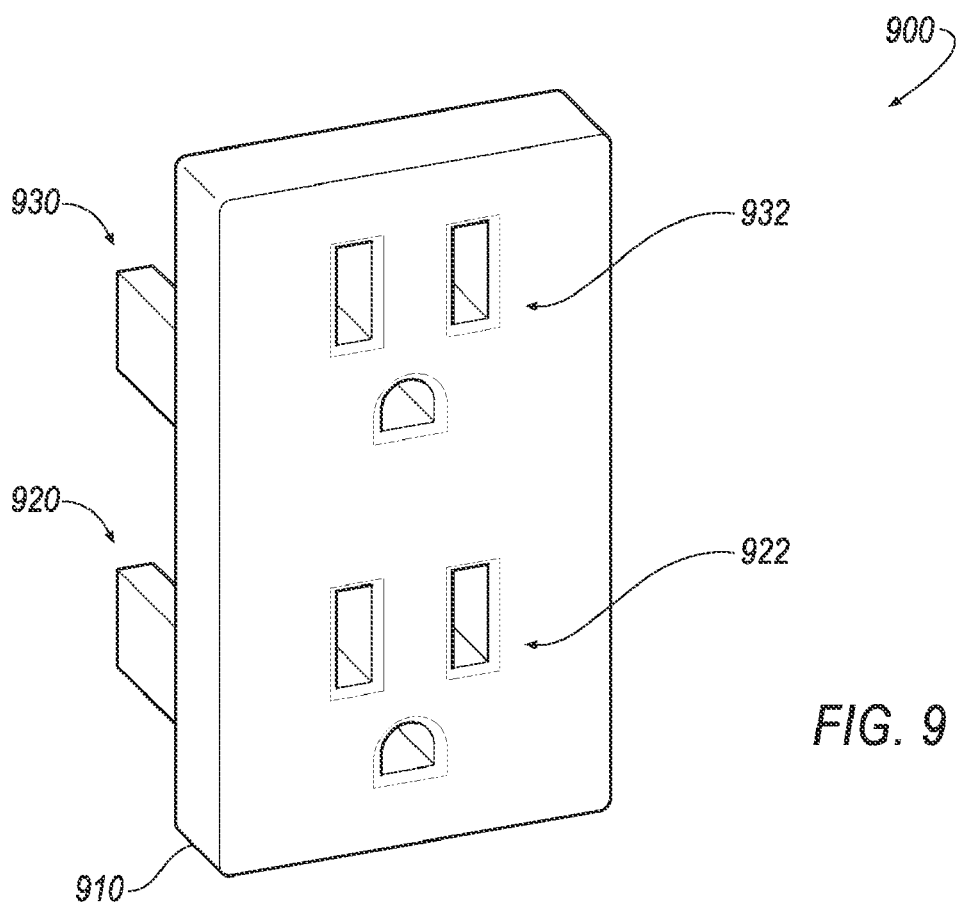
FIG. 9 is an example of a wall outlet alternative energy saving device.

FIG. 9 is an example of a wall outlet alternative energy saving device 900. The example here shows a stylized packaging alternative for the energy saving device 100 of FIG. 1. In use, a user may plug device 900 into a standard dual outlet where power pins 920, 930 connect with the receptacle and hold device 900 in place. Device 900 may be encased in a housing 910 and includes two receptacles 922, 932 for the user to plug in loads. Here, energy saving device 100 is employed as a user installable device for retro-fitting existing receptacles. In this example, power pins 920 map to inputs 110 (see FIG. 1) and receptacle 932 maps to where load 120 (see FIG. 1) is plugged in.

Figure 10:
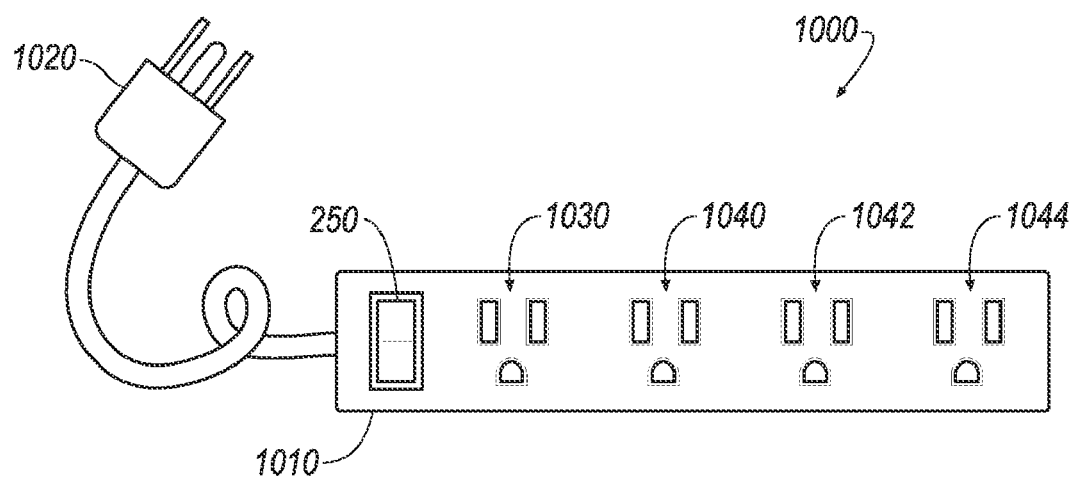
FIG. 10 is an example of a power strip including energy saving features.

FIG. 10 is an example of a power strip 1000 that includes an alternative energy saving device. A configuration similar to a "power strip" 1010 is shown having a power source plug 1020 as an input. Outputs include a master outlet 1030 and multi-slave outlets 1040, 1042, 1044 controlled by an energy saving device that monitors master outlet 1030. However, energy saving device 1000 does not simply switch slaves 1040, 1042, 1044 based on the power consumption of master 1030. Rather, energy saving device 1000 switches all of master

1030 and slaves 1040, 1042, 1044 based on the power consumption of master 1030. The user has a manual input (e.g., user switch 170) to override the operation of energy saving device 1000 to manually switch the outlets on or off.

Moreover, as discussed herein, the energy saving device may also be built into a product for saving power. In an example, the energy saving device may be designed into the circuitry of a television to reduce power consumption. In another example, the energy saving device may be designed into a phone charger. In yet another example, the energy saving device may be designed into a standard transformer for use generally with electronics and electrical devices. Moreover, the systems and methods described herein may be used to provision power to sub-systems within larger designs and need not be located at the main power input.

By employing the examples of energy saving devices as described herein, energy loss from phantom loads may be reduced significantly. For example, a television that includes a cathode ray tube (CRT) with a transformer-based power supply may consume around 120 Watts when active. When inactive (e.g., in a standby mode) the idle power consumption may be around 8 Watts of phantom load. When using the energy saving devices as described herein, power savings from phantom loads may be around 66% which is a direct function of the active duty cycle percentage as described above with respect to FIGS. 3 and 4. Thus, the power consumed by the television when an energy saving device is employed may be around 2.6 Watts at idle. The difference from an always-connected idle condition (8 Watts) is about 5.4 Watts of saved power. Other devices may include, for example a laptop computer power supply which at standby consumes about 3 Watts of phantom load. Another example is a desktop computer that consumes about 8 Watts at idle.

Examples of the threshold as discussed herein to determine the load is "active" or "inactive" state are discussed in detail above and in particular with FIGS. 3, 4, 7, and 8. In the example of a CRT television, the inactive state demands about 8 Watts and the active state demands about 120 Watts. The threshold may then be safely set anywhere between 8 Watts and 120 Watts. However, a margin of error may be factored in to allow the threshold to be used with a multitude of CRT televisions or to account for manufacturing variations that could shift the inactive and active power demand. Thus, a safe threshold value may be set at 64 Watts, which is the midpoint between the active and inactive power demand values. In another example, a laptop computer power supply demands around 3 Watts while inactive and about 26 Watts when active. Thus, a safe threshold value may be set at 14.5 Watts. In another example, a desktop computer power supply demands around 8 Watts while inactive and about 120 Watts when active. Thus, a safe threshold value may be set at 64 Watts. Of note is that while the power demand values are discussed in watts, as well as the threshold in the instant case, the actual threshold value used depends upon the methodology used to determine the load demand which may include current measurement, power measurement, or voltage measurement. One of ordinary skill in the art will recognize that the threshold value may be adapted to the particular load demand measurement employed.

It is noted that the above examples are not indicative of any particular load and should not be used in any way to limit this disclosure. Indeed, televisions, laptop computer power supplies, and desktop computers, are only some examples of load types that may be employed using the load control method including an energy saving device. Moreover, each load discussed herein is used as an example of how to employ an energy saving device. The loads may have wide ranges of active demands and inactive demands based on their technology, manufacture, intended use, and other conditions. Thus, the loads, and in particular, threshold values discussed do not translate to limiting values and are only exemplary.

Figure 11:
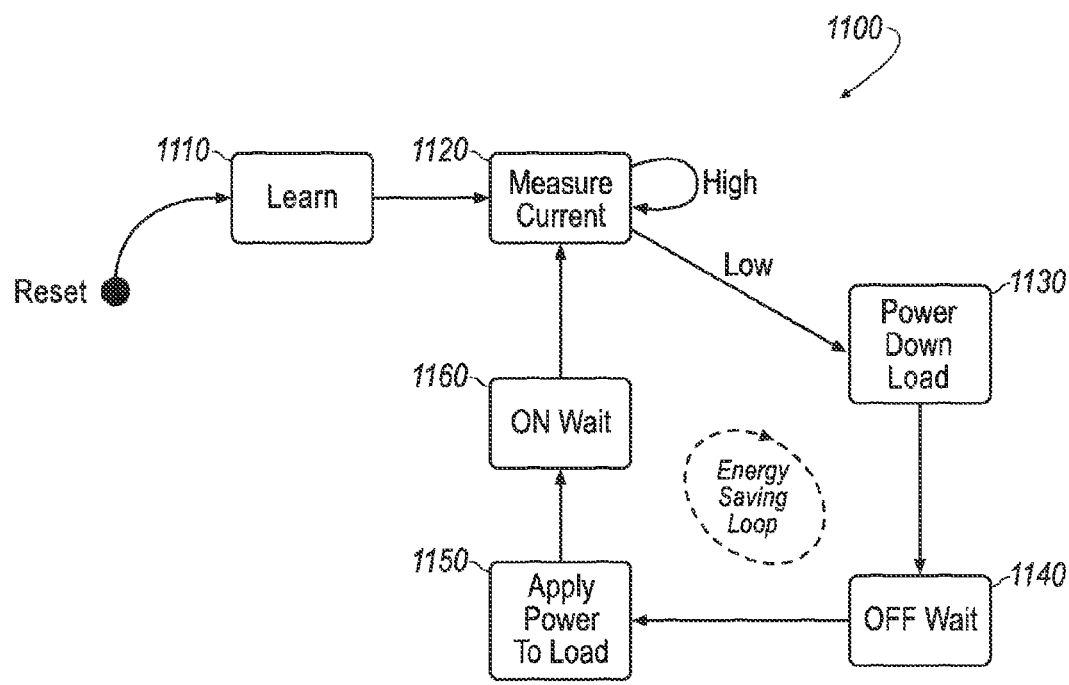
FIG. 11 is an example of a state transition diagram for use with the energy saving devices described herein.

FIG. 11 is an example of a state transition diagram 1100 for use with the energy saving devices described herein. From a reset state the system enters a learn state 1110 where the power saving device adapts to an arbitrary load. This adaptation may include applying power to a load and determining the "on" and "off" currents as well as determining the thresholds for the power saving device to use when determining the power state of "on" and "off" for the load. Learn state 1110 is described in detail below with respect to FIG. 11A. After learn state 1110 is complete, control proceeds to a measure current state 1120.

In measure current state 1120, power is applied to the load and the power saving device determines whether a load demands power equal to or more than the "on" threshold determined in learn state 1110, or whether the load demands power less than or equal to the "off" threshold determined in learn state 1110. To provide hysteresis, if the initial power demanded by the load when entering measure current state 1120 meets the "on" threshold, then the power is determined to be "high" and control remains at measure current state 1120 with full power applied to the load. If the power demanded by the load meets the "off" threshold, then the power is determined to be "low" and control proceeds to power down load state 1130.

In power down load state 1130, power is turned off to the load and a power saving is achieved. Control then proceeds to off wait state 1140.

In off wait state 1140, a time delay is measured for a predetermined time with the power turned off to the load. When the predetermined time elapses, control proceeds to apply power to load state 1150. Note that the predetermined time may be adjustable for various power saving mode schemes. For example, as discussed below with respect to FIG. 18, the delay may be adjustable to predetermined times to allow for increased power savings, or alternatively, increased response time of the load turn-on.

In apply power to load state 1150, full power is applied to the load. Control then proceeds to an on wait state 1160.

In on wait state 1160, a time delay is measured for a predetermined time with the power turned on to the load. This predetermined time allows for the load power to stabilize after initial turn on so that measurements may proceed later in the process to determine the operating power of the load, rather than the inrush load on initial turn on. When the predetermined time elapses, control proceeds to measure current mode 1120 and the process repeats.

Figure 11B:
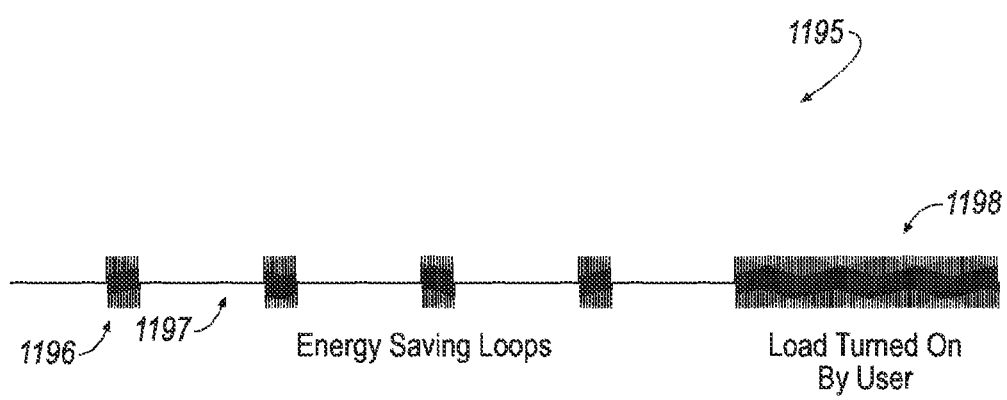
FIG. 11B is an example of the power applied to the load in an energy saving mode and a full power mode.
Figure 11A:
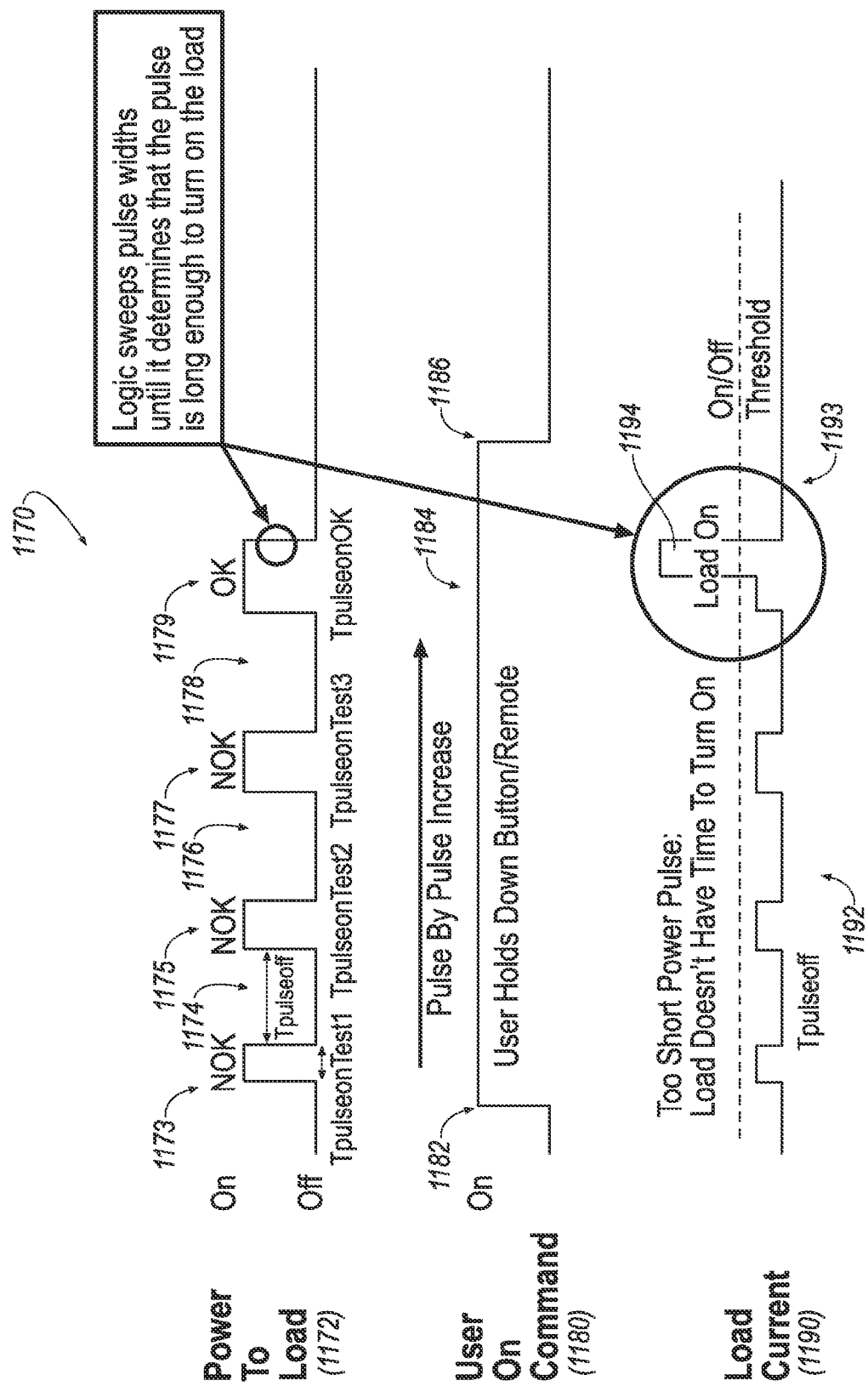
FIG. 11A is an example of a timing diagram for an adaptive power savings system for use with the energy savings devices described herein.

FIG. 11A is an example of a timing diagram 1170 for an adaptive power savings system for use with the energy savings devices described herein. A first timing diagram 1172 shows the power to the load as "on" or "off". A second timing diagram 1180 shows the status of the load power button as triggered by a user. A third timing diagram 1190 shows the load current demand.

To determine the whether a load is turned "on", (e.g., for a television or other appliance) the minimum length of time with full power applied to the load for testing the power demand thresholds may be a fixed time, or it may be adjustable (e.g., as discussed above with respect to measure current state 1120 of FIG. 11). This minimum "on" time allows the load to turn on and the power consumption to stabilize. If, for example, the "on" time is too short, the load may not have enough time to achieve a fully "on" state and the power demand measurement may be inaccurate, or may be premature, resulting in an incorrect determination of the load's power state. To allow for arbitrary loads being connected to the power saving device, the power "on" time may be adaptive for various loads in a learning mode.

In an example, the user may turn the load "on" 1182 by holding the load's power button or remote button and hold the power "on" during a testing period 1184. After testing period 1184 is complete, the user may release the power button 1186. In coordination with learn mode 1110 of FIG. 11, the learn mode may be triggered by the power saving device, for example, by a user button or when the power saving device is initially connected to the power source and the load connected to the power saving device. When learn mode 1110 is active, the power saving device may sweep the "on" time from a short time to a longer time to determine the threshold at which the load demands power above the "on" threshold. For example, the initial "on" time 1173 may be a short on time (e.g., 50 ms) and if the load does not demand power above the "on" threshold then the power saving device may increase the "on" time 1175, 1177, 1179 until the load crosses the "on" power demand threshold 1194. Between the full power "on" times, an "off" time 1174, 1176, 1178 is provided so that the load has an opportunity to power "off" to avoid a false positive indication of the load status and/or load demand. Note that although FIG. 11A as discussed herein provides three examples of pulse widths for the "on" time (e.g., "on" times 1175, 1177, 1179) the adjustable process may be provided with only two pulse widths, or may continue with an infinite number of increasing duration pulse widths.

As shown in timing diagram 1170, the load is determined to be "off" during a test period 1192, and then when full power is applied to the load for a long enough time 1179, the load demands power above the on/off threshold 1193. At this time, learn mode 1110 may determine that the load needs a minimum full power on time described by time period 1179 before a determination can be made as to the load status of on or off. In this way, the power saving device may optimize the "on" time for testing load demand to further reduce power consumption when the load is "off".

The variable times for each "on" time 1173, 1175, 1177, 1179 may be related back to FIGS. 7 and 8 as the time from activation time 510 to stabilization end time 830 and/or decision time 530 (see FIGS. 7 and 8). Alternatively, the Each "on" time 1173, 1175, 1177, 1179 may have an increasing time providing for more time the load during stabilization period 820 and prior to sampling window 840. Moreover, when used in conjunction with a soft start feature (disclosed below with respect to FIG. 23B) the inrush may be reduced which may substantially reduce false-positive determinations that a load is "on".

FIG. 11B is an example of the power applied to the load in an energy saving mode 1195 (e.g., non-continuous power when the load is in a non-operating condition) and a full power mode 1198 (e.g., continuous power when the load is in an operating condition). When a load is "off", the power saving device may turn the load "on" 1196 to test the load power demand, such as is performed in measure current state 1120. If the load power demand is determined to be in the "off" state, power is turned off for a predetermined time 1197 to save power. Alternatively, if the load power demand is determined to be in the "on" state, full power is turned on 1198 to the load allowing normal use of the load. If load demand reduces to below the "off" threshold, the power saving device reverts back to energy saving mode 1195.

Figure 12:
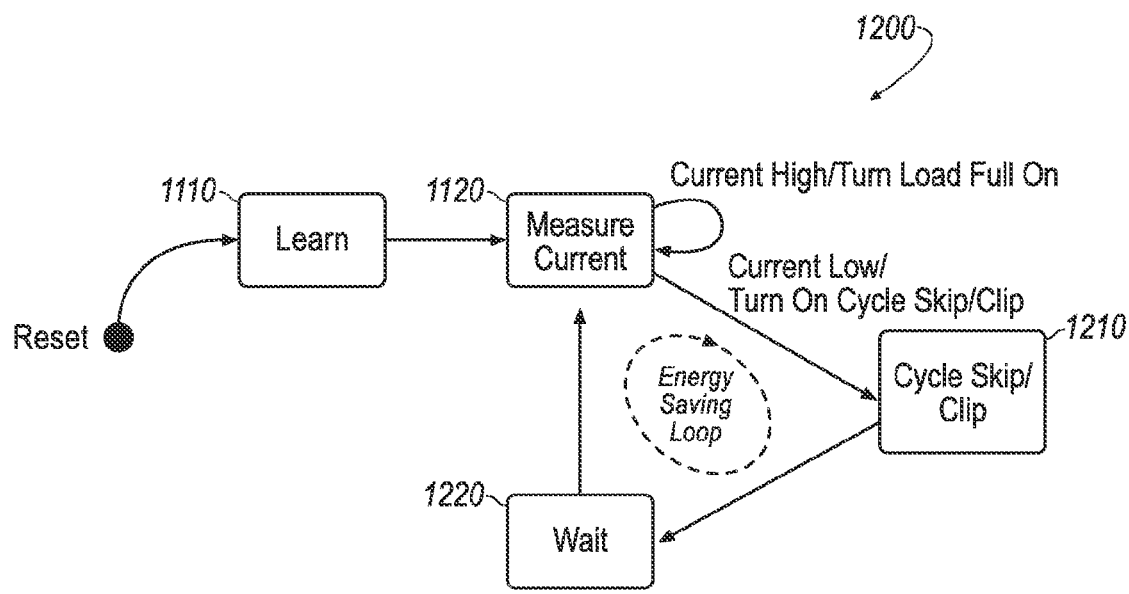
FIG. 12 is an example of a state transition diagram for use with the energy saving devices described herein.

FIG. 12 is an example of a state transition diagram 1200 for use with the energy saving devices described herein. As discussed above with respect to FIGS. 11 and 11A, a learn state 1110 may be included to allow for optimization and/or adjustment of the load on/off times to determine the load status, and a measure current mode 1120 to allow for the determination of load power demand and load status. Diagram 1200 shows an alternative power saving mode that allows for cycle skipping and/or cycle clipping. In measure current state 1120, if the load power demand meets the "off" criteria, control proceeds to the cycle skip/clip state 1210. In cycle skip/clip state 1210, the power to the load may be modified to include cycle skipping and/or cycle clipping to provide energy savings. For example, cycle skipping allows for a single cycle of "on" and a predetermined number of cycles of "off" to be sent to the load. This power saving strategy may allow some power to be applied to keep the load "alive" during the off periods to preserve, for example, volatile memory in the load. Alternatively, cycle clipping may be employed to send power to the load, but certain portions of the cycles may be clipped to conserve power. After cycle skip/clip state 1210 is initiated, control transfers to a wait state 1220. When a predetermined wait time has elapsed, the control proceeds to measure current state 1120 where the load may be tested for power demand.

Figure 12A:
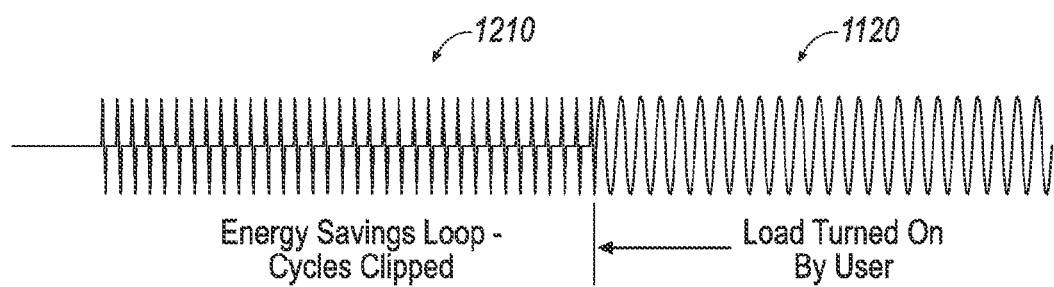
FIG. 12A is an example of a clipped energy saving mode and a full power mode.
Figure 15:
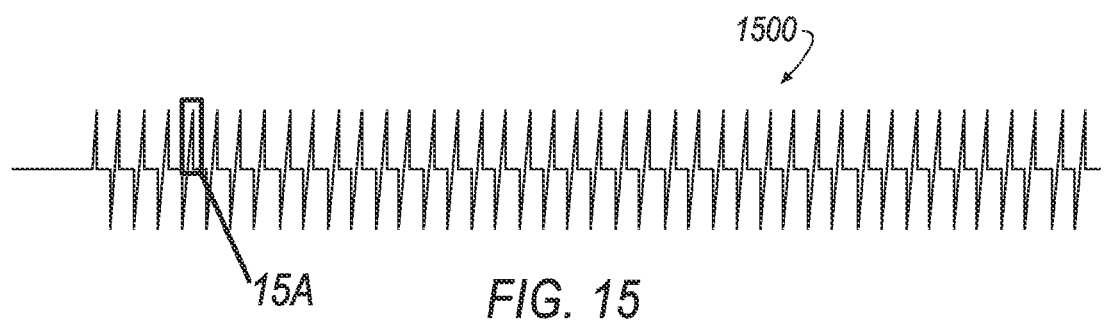
FIG. 15 is an example of cycle clipping that may be employed during a clipped energy saving mode.
Figure 15A:
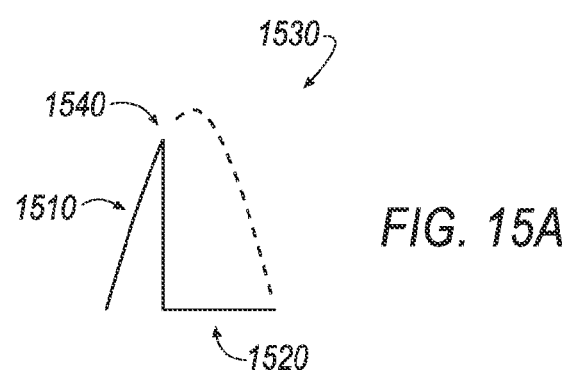
FIG. 15A is an example of a portion of an AC sine wave that has been clipped.

FIG. 12A is an example of a clipped energy saving mode 1210 and a full power mode 1120. When clipping is employed for power saving, only a portion of the power is provided to the load. As shown in FIG. 15, cycle clipping may be employed during clipped energy saving mode 1210. The clipping may provide only a portion of an AC power signal to the load to conserve power. For example, FIG. 15A shows a portion of an AC sine wave that has been clipped. An on portion 1510 is provided where power flows to the load. An off portion 1520 is where the AC cycle has been clipped. An ideal AC signal would have the full partial cycle 1530. However, the clipping turns power off at clipping point 1540.

Figure 13:
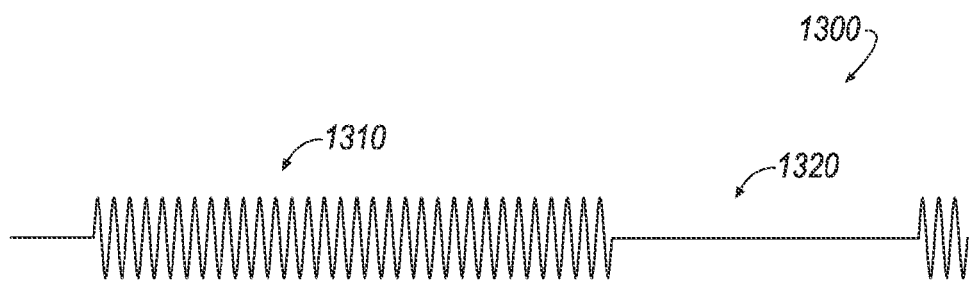
FIG. 13 is an example of power pulsing as applied to the example of FIG. 11.

FIG. 13 is an example of power pulsing as applied to the example of FIG. 11. Power is applied 1310 for a predetermined time (e.g., corresponding to full power mode 1120) and power is turned off for a predetermined time (e.g., corresponding to power down load state 1130). The predetermined on and off times may be adjusted using various techniques as described herein, including response to a human-in-area detection system (see FIG. 18).

Figure 14:
FIG. 14 is an example of cycle skipping that may be employed with the example of FIG. 12.

FIG. 14 is an example of cycle skipping, that may be employed with the example of FIG. 12. When cycle skipping (e.g., during cycle skip/clip state 1210), a full cycle may be provided to the load followed by an off period. In this way, the load may be provided with some power during the energy saving period rather than having power fully off.

Figure 16:
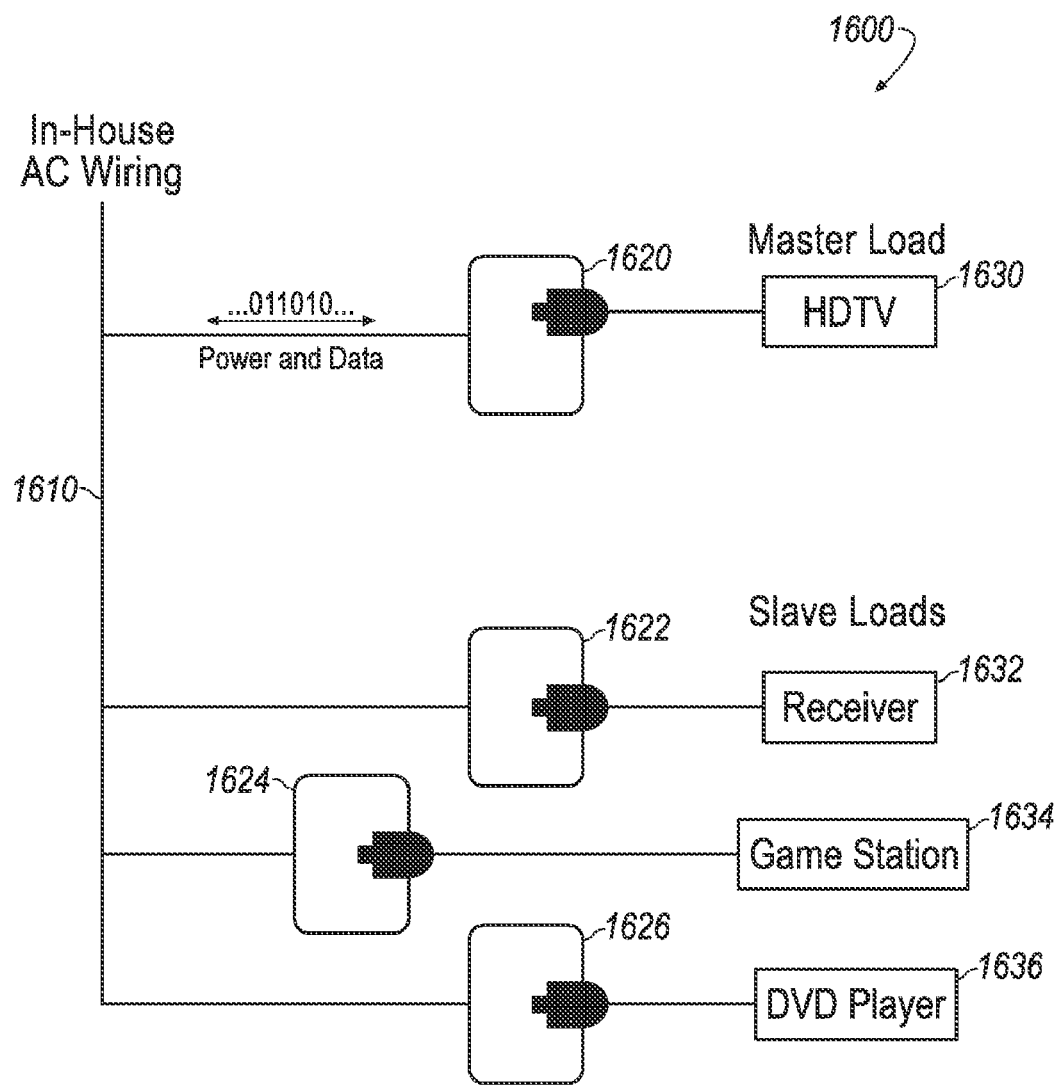
FIG. 16 is an example of an energy savings system 1600 that communicates with and controls other loads.

FIG. 16 is an example of an energy savings system 1600 that communicates with and controls other loads. A master load 1630 (e.g., such as a television) may be controlled from a master energy saving device 1620. Master energy saving device 1620 may communicate (e.g., digital and/or analog communication) with slave power savings devices 1622, 1624, 1626 using the power lines (e.g., power wiring). Slave power savings devices 1622, 1624, 1626 may control slave loads such as a receiver 1632, a game station 1634, and a DVD player 1636, respectively. The slave loads 1632, 1634, 1636 may be configured with the slave power saving devices such that when the master load 1630 is not in use, the power is turned off to slave loads 1632, 1634, 1636. This system configuration allows master power saving device 1620 to determine the on/off status of master load 1630 and control slave loads 1632, 1634, 1636 to a full off status when master load 1630 is determined to be off, and a full on status when master load 1630 is determined to be on. In this way, additional power savings may be achieved for slave loads 1632, 1634, 1636 when master load 1630 is off.

Communication from master energy saving device 1620 and slave power savings devices 1622, 1624, 1626 may be through the power wiring, such as is described by the X10 standard for home automation, or other protocols (e.g., power line communication). Alternatively, the communication may be wireless (e.g., Bluetooth or 802.11-type communications). Moreover, to facilitate communications, master energy saving device 1620 may be keyed to slave power savings devices 1622, 1624, 1626 using a code that may be programmed by a user, or pre-programmed. Such a keying system allows for multiple masters and slaves to operate independently using the same communication medium (e.g., wiring or wireless).

Figure 17:
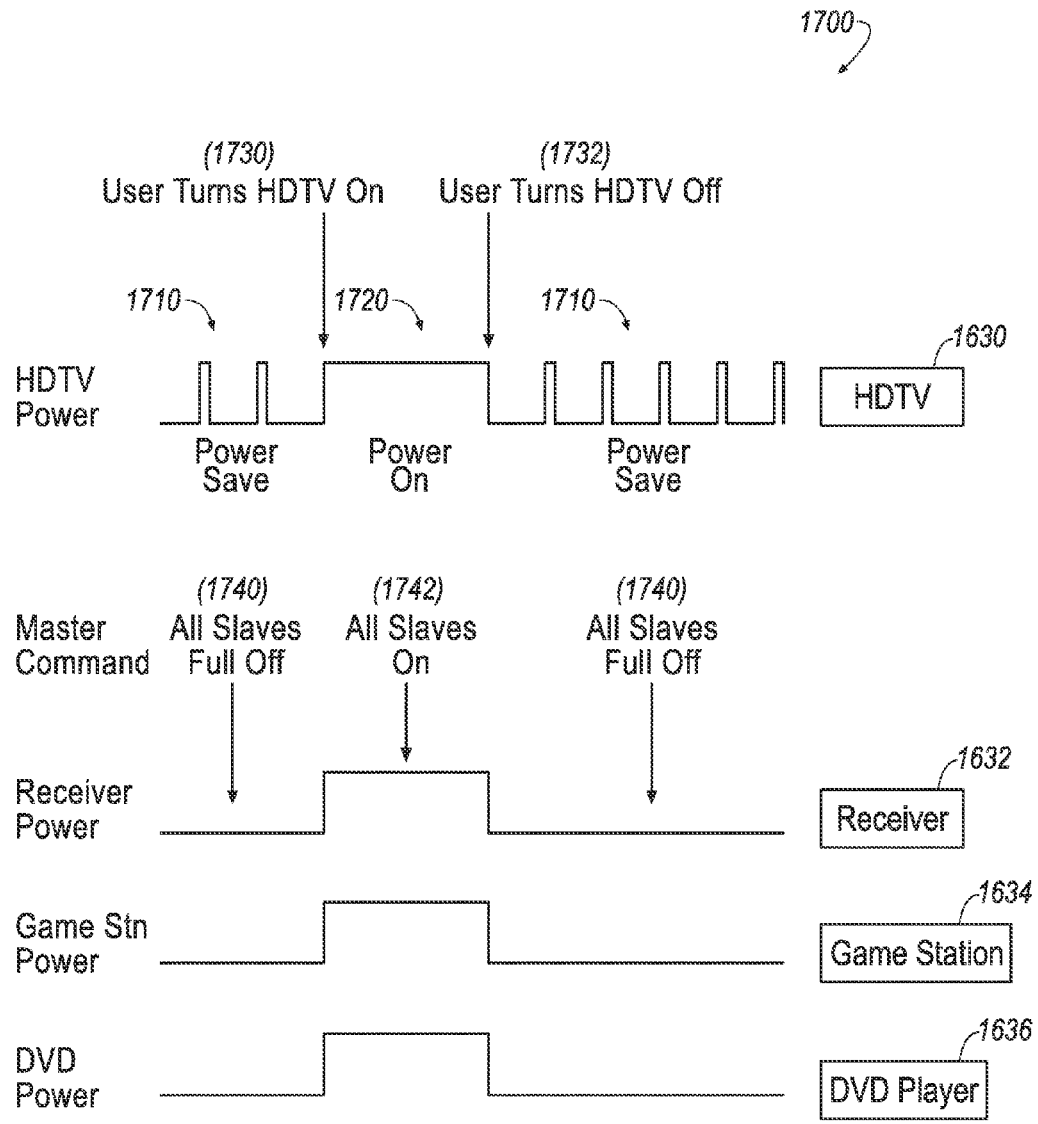
FIG. 17 is an example of a timing diagram for the energy saving device of FIG. 16.

FIG. 17 is an example of a timing diagram 1700 for the energy saving device of FIG. 16. During a power saving mode 1710 when master load 1630 is determined to be off, all slaves 1632, 1634, 1636 are turned off. For master load 1630, master power saving device 1620 may periodically determine the power status to determine whether the load is on or off. When master load 1630 is turned on 1730, master power saving device 1620 turns the master load to full power 1720 and sends a signal to slave power savings devices 1622, 1624, 1626 to turn all slaves on 1742 (e.g., see slaves 1632, 1634, 1636 of FIG. 16). When master load 1630 is turned off 1732, master power saving device 1620 reverts to power saving mode 1710 and sends a signal to slave power savings devices 1622, 1624, 1626 to turn all slaves off 1740 (e.g., see slaves 1632, 1634, 1636 of FIG. 16).

Figure 18:
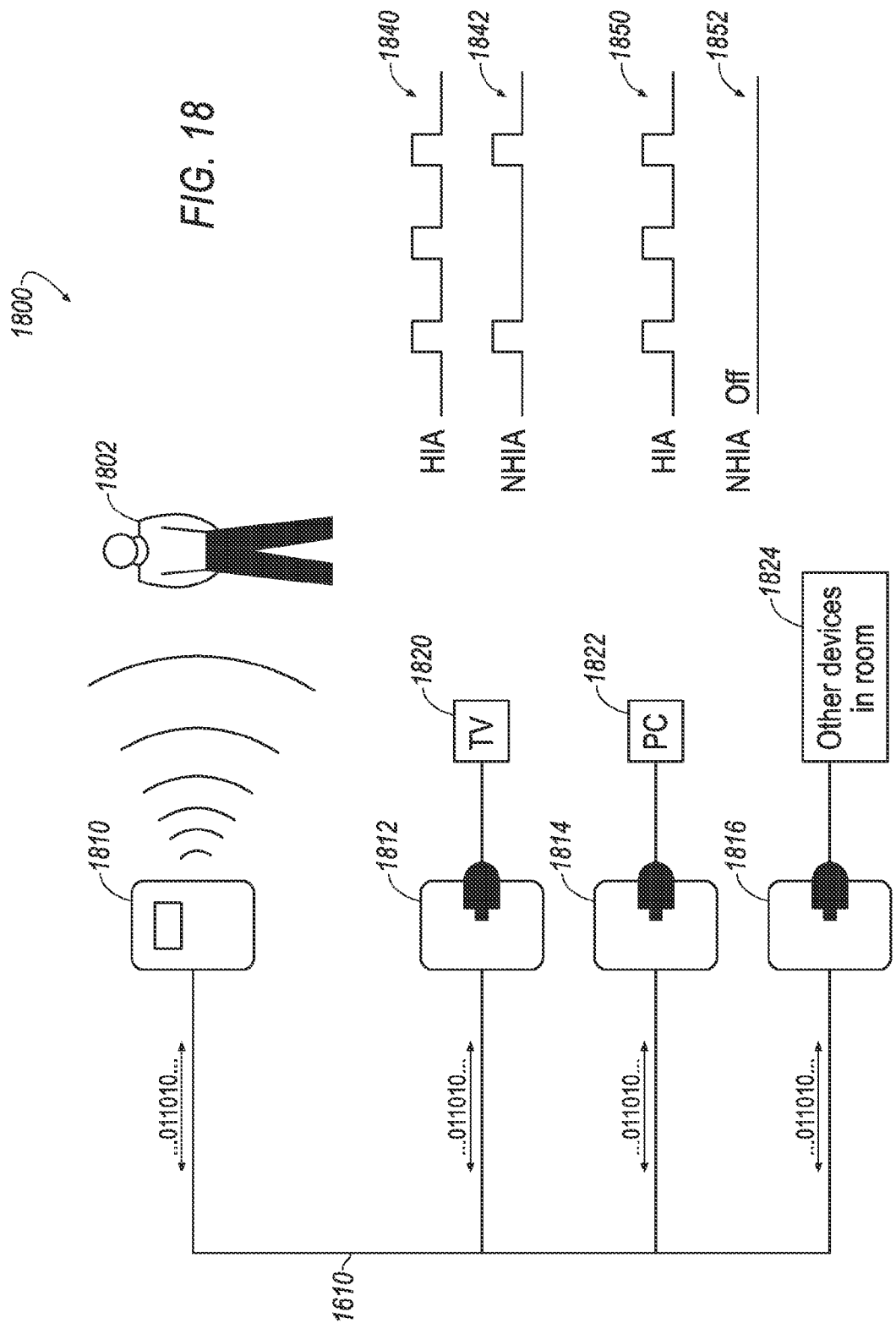
FIG. 18 is an example of a human-in-area detection system for use with the energy savings devices described herein.

FIG. 18 is an example of a human-in-area detection system 1800 for use with the energy savings devices described herein. In an example, a sensor or detector 1810 may be configured for use with power saving devices 1812, 1814, 1816. Sensor 1810 may be configured as a motion sensor, a thermal sensor, a sound sensor, or other type of sensor to detect persons, for example without limitation. Sensor 1810 may detect a person 1802 within a predetermined proximity and communicate the presence of the person 1820 to power saving devices 1812, 1814, 1816 as a "human-in-area" ("HIA") signal. Alternatively, when person 1802 is not detected or in range of sensor 1810, a "no-human-in-area" ("NHIA") signal may communicate to power saving devices 1812, 1814, 1816.

Power saving devices 1812, 1814, 1816 may then use the HIA or NHIA signals to alter their power saving strategies to provide for increased power savings when the NHIA signal is present, or to increase response time when the HIA signal is present. For example, power saving device 1812 may be connected to a television load 1820. When the HIA signal is present, a decreased response time strategy 1840 may be employed where the duration between testing the load status is reduced. Alternatively, when the NHIA signal is present, an increased power saving strategy 1842 may be employed that increases the duration between testing the load status. In and example, the period of the pulses of power for the increased power saving strategy 1842 (e.g., a second power saving strategy) is longer than the period of the pulses of power for the increased response time strategy 1840.

In another example, a personal computer 1822 may be connected to a power saving device 1814. In this example, when the HIA signal is present, the power saving mode may be unchanged from a normal power saving mode. However, when the NH IA signal is present, the load may be switched completely off 1852 to achieve greater power savings.

Other loads 1824 may be controlled by power saving device 1816 that may or may not change power saving strategies upon the present of the HIA or NHIA signals.

When discussing the HIA and NHIA power saving strategies as it relates to the power saving devices as discuss herein, sensor 1810 does not directly control the on/off status of the load. However, where the power saving devices are configured to use the HIA and NHIA signals, they may alter their power strategies.

Communication from sensor 1810 and power saving devices 1812, 1814, 1816 may use wired, including power wiring, or wireless communications. Also, note that while motion sensor 1810 is shown as a separate unit in FIG. 18, it may also be integrated with a power saving device.

Figure 19A:
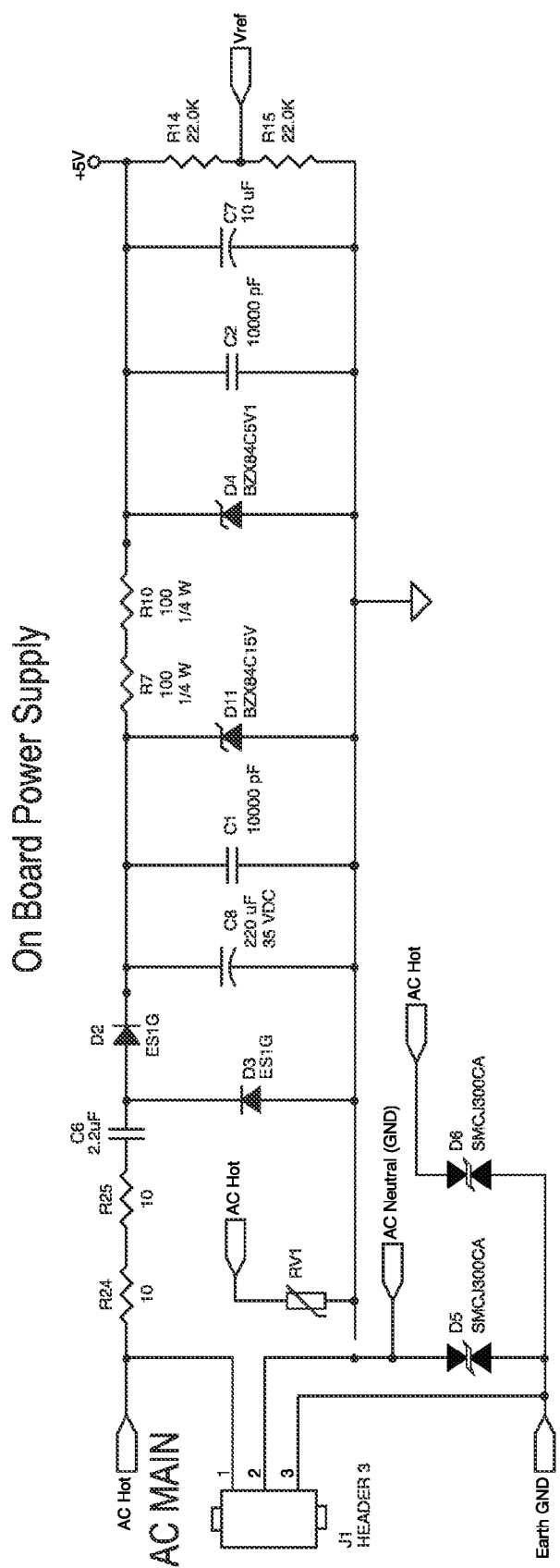
FIG. 19A is a partial schematic of a power supply subsystem for use with the power saving device.

FIG. 19A is a partial schematic of a power supply subsystem for use with the power saving device. In general, the power supply subsystem converts the AC mains power to 5V DC used for power the load switch subsystem (see FIG. 19B), the logic subsystem (see FIG. 19C), load current measurement subsystems (see FIG. 19D), and user input/output.

The power supply subsystem is generally divided into an AC and DC section that is divided by diode D2. The AC section includes inrush protection resistors R24, R25 to prevent excessive current spikes. Capacitor C6 functions as an isolation capacitor that couples energy from AC mains into regulator DC section. Diodes D5, D6 provide over voltage protection. Diodes D2, D3 are half wave rectifiers for AC to DC conversion.

In the DC section, capacitor C8 functions as a preregulator holding capacitor to smooth AC signal into DC. Capacitor C1 functions as a high frequency filter capacitor. Diode D11 (a Zener diode) functions as a preregulator to prevent over voltage to remaining circuit elements. Resistors R7, R10 function as a Zener shunt regulator resistor which in combination with diode D4 (a zener diode) forms basis of 5V DC regulator. Capacitor C7 functions as a power supply low frequency smoothing capacitor. Capacitor C2 functions as a high frequency filter capacitor. Resistors R14, R15 function as a voltage divider (generally 2:1) to supply a ½ Vcc reference voltage to the load current measurement subsystem.

Figure 19B:
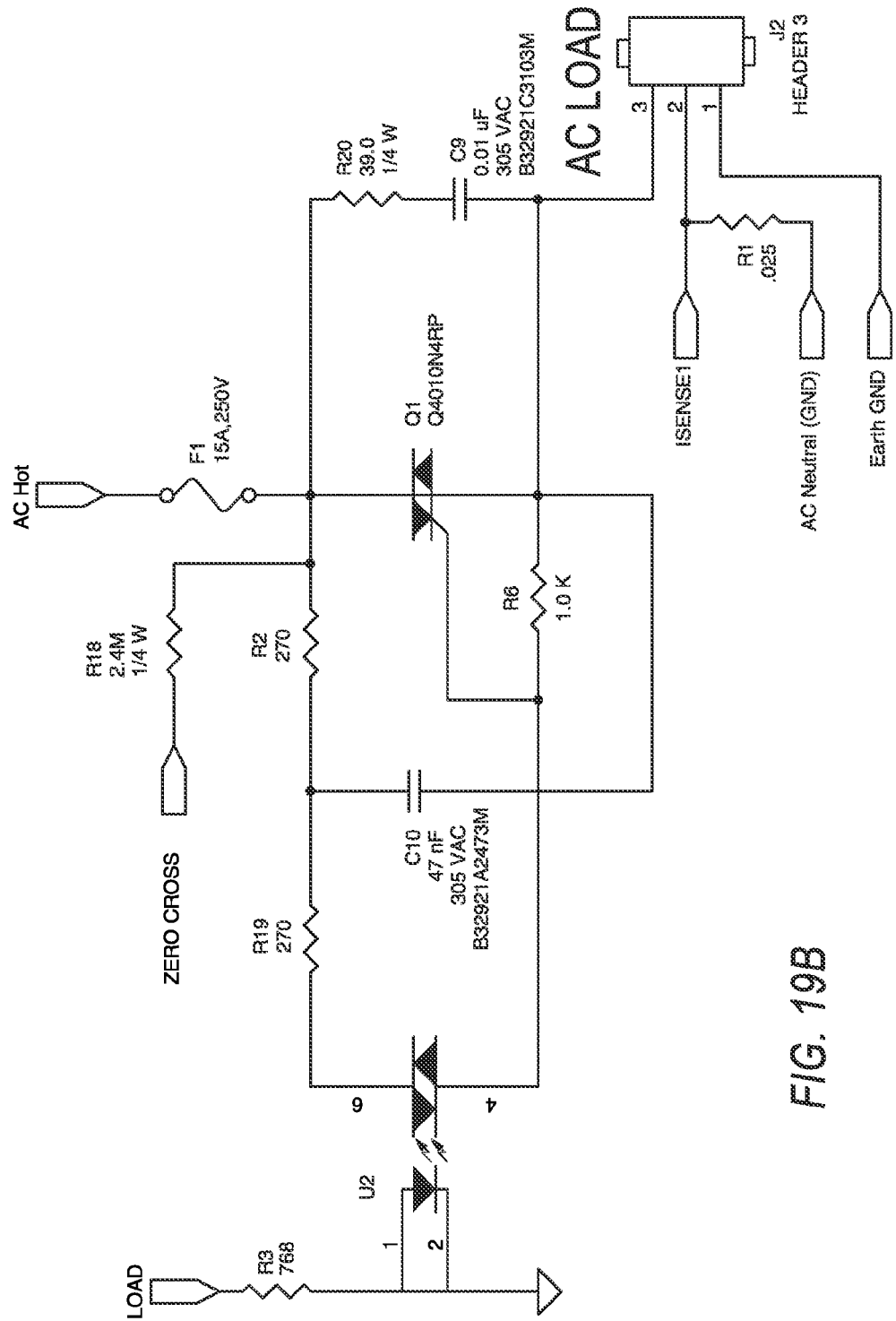
FIG. 19B is a partial schematic of a load switch subsystem for use with the power saving device.

FIG. 19B is a partial schematic of a load switch subsystem for use with the power saving device. The load switch subsystem functions to apply or cut power to the load under instruction from the logic subsystem.

Figure 19C:
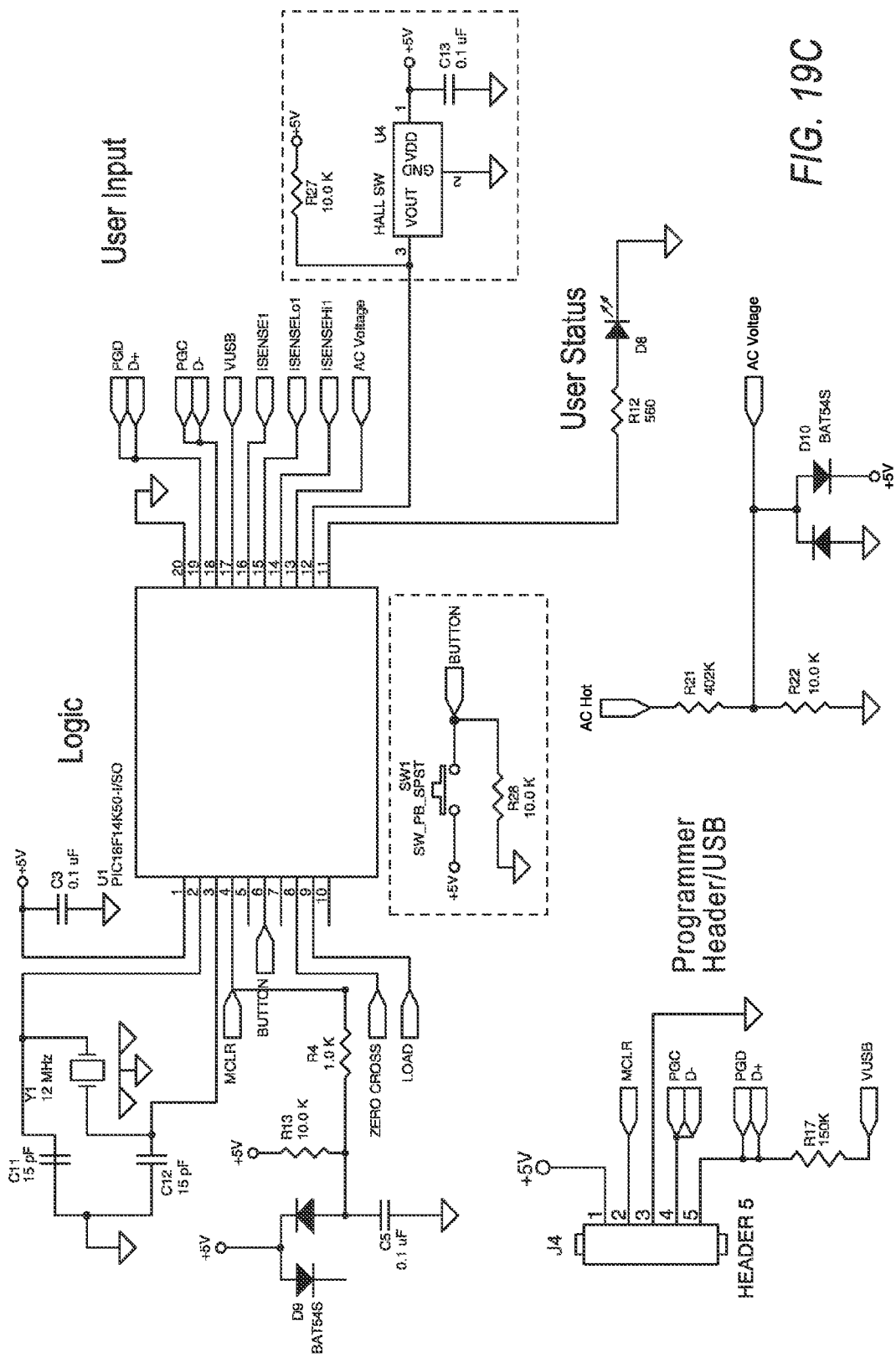
FIG. 19C is a partial schematic of a logic subsystem for use with the power saving device.

Optoisolator U2 and resistor R3 permit AC power to be applied/cut to the load by a low voltage DC microcontroller (see U1 of FIG. 19C). Resistors R19, capacitor C10, and resistors R2, R6 function as a triac biasing circuit, capable of handling reactive loads. Resistor R18 functions as a zero cross detector resistor used to inform the logic subsystem when AC signal is generally at zero volts. The zero cross detector is generally used to apply/cut power synchronous to the AC mains voltage signal. Resistor R20 and capacitor C9 function as a TRIAC snubber circuit which prevents inadvertent turn-on of TRIAC with reactive loads. TRIAC Q1 is used as a switching element to apply/cut power to load. Fuse μl functions as a safety fuse to prevent undesirable failure modes in case of circuit failure or user connecting an excessive current demand load beyond the rated use. MOV RV1 (a Metal Oxide Varistor) functions for output protection. Connectors J1, J2 are male and female AC connections.

FIG. 19C is a partial schematic of a logic subsystem for use with the power saving device. The logic subsystem performs command and control of the power saving device and controls energy savings functions by instructing modulation of power to load based on load state and load on/off demand as sensed by the load current measurement block (shown in FIG. 19D).

Microcontroller U1 is a microcontroller with internal ND (analog to digital converter) and EEProm (non-volatile storage) that executes software capable of controlling the load as discussed herein based on various scenarios that include evaluation of load current demand. Crystal Y1 and capacitors C11, C12 function as an oscillator for the microcontroller U1. Diode D9, capacitor C5 and resistors R13, R4 function as a reset circuit for microcontroller U1. Resistors R21, 22 and diode D10 function as an AC mains voltage monitor used for data collection device to calculate true power. Switch U4 (shown here as a Hall Effect sensor) and resistor R27 function to read a user command for entering learning modes and other user-input related features. Switch 51 and resistor R28 are an alternative user input configuration having a standard push button switch. Resistor R12 and diode D8 function as a status LED to indicate system status to user. Capacitors C3, 13 function as high frequency bypass capacitors. Jack J4 and resistor R17 provide for flash programming of microcontroller U1.

Figure 19D:
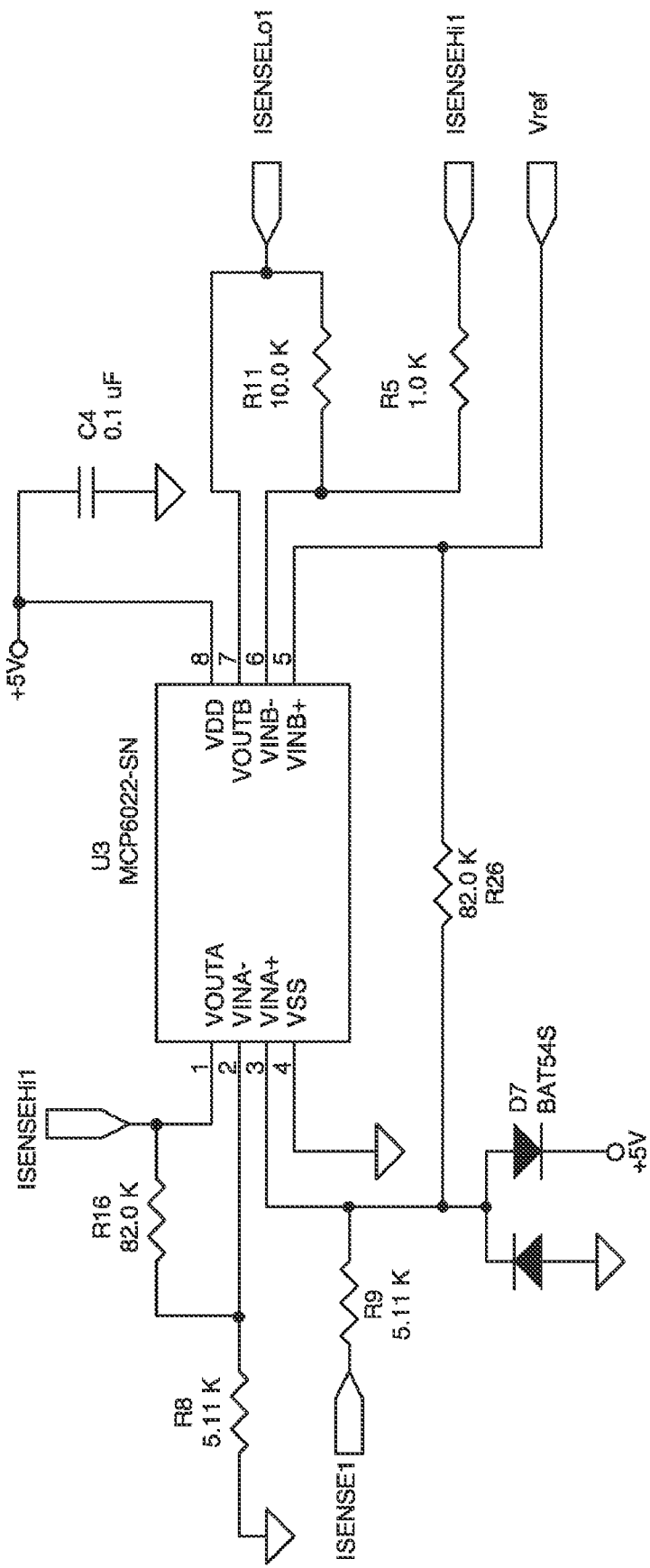
FIG. 19D is a partial schematic of a load current measurement subsystem for use with the power saving device.

FIG. 19D is a partial schematic of a load current measurement subsystem for use with the power saving device. The load current measurement subsystem measures load current demands and present it to the logic subsystem in a usable form (e.g., 0-5V for analog to digital conversion). In general, the topology of the load current measurement subsystem includes a ground reference resistive 2 stage differential amplifier.

Operational amplifier U3 is a low current, low offset voltage rail to rail CMOS OP amp. Resistor R1 is a sense resistor to convert load current into a low voltage (for later amplification). Resistors R5, R8, R9, R11, R16, and R26 are resistors chosen to provide a two stage differential amplifier with 82 counts per amp for stage 1 and 820 counts per amp for stage 2 with R1 as the sense resistor. Paired diodes D7 function as microcontroller input protection diodes. Capacitor C4 functions as a high frequency bypass capacitor.

Figure 20:
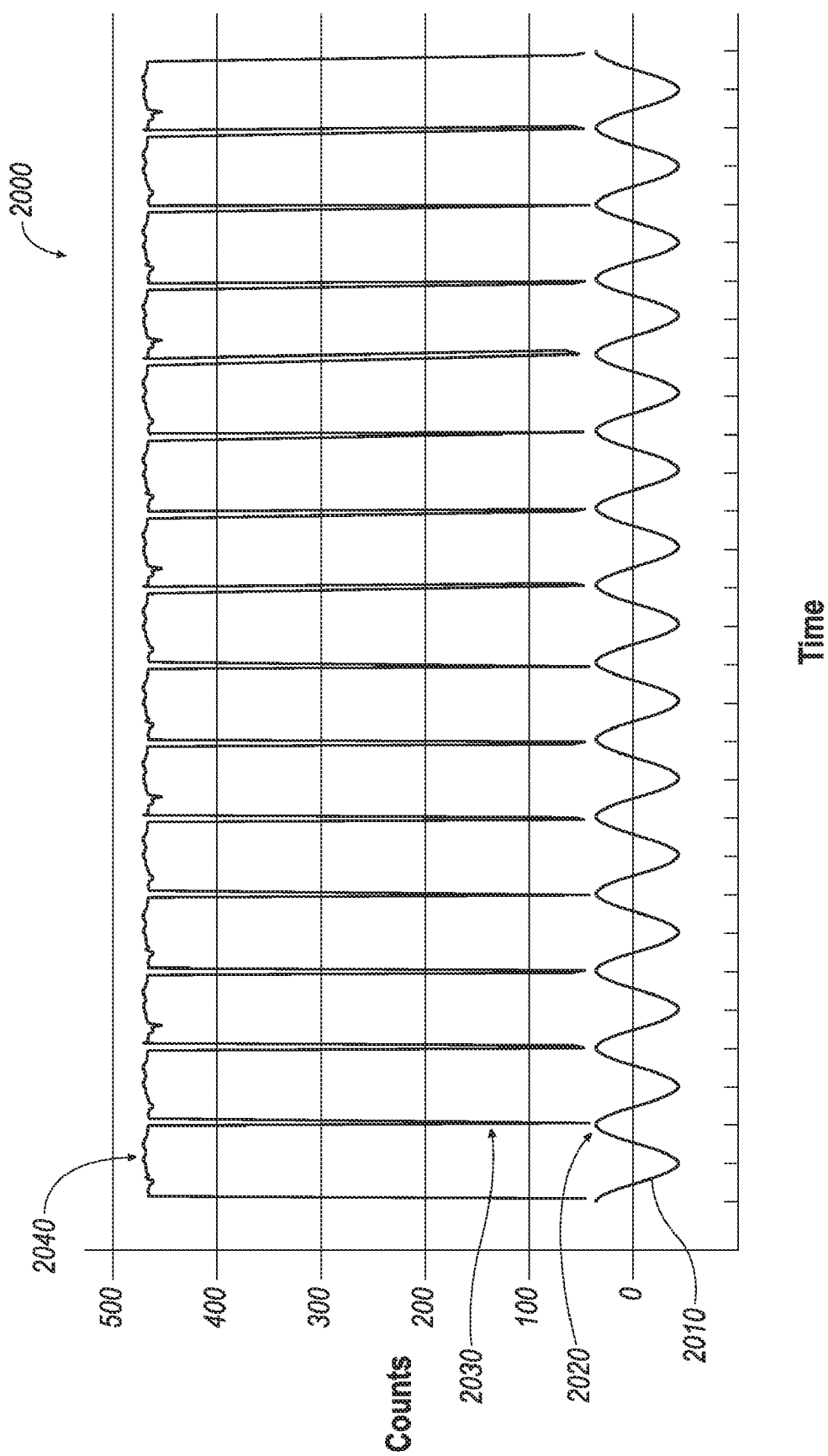
FIG. 20 is an example of a power measurement.

FIG. 20 is an example of a power measurement including time and ADC counts as references. For reference a standard AC mains signal 2010 is overlaid for context. The ADC counts correspond to a current measurement generally provided by the load current measurement subsystem shown in FIG. 19D and as converted by the ADC of microcontroller U1 (shown in FIG. 19C). As shown the lower the ADC count, the higher the power consumption. At the peak of the sine wave 2020, many loads exhibit a spike in power consumption 2030 (shown as the downwardly extending power spike). This may be due to switching regulators at the load that pull power in short bursts to increase efficiency. An example of a burst current is about 5 A which corresponds to about 550 W, where the average power of the load shown may be about 67 W. This short burst of power consumption at the peak of the AC sine wave 2020 may be caused by the inductive nature of the power supply transformer and capacitor reactances in the load. However, each load may perform differently, and may not include a power spike 2030 at all depending on the load configuration.

FIGS. 21-23B discuss a soft start system that may reduce wear-and-tear on electrical components in the load that may include derating of the components. In general, the soft start system reduces the inrush current and voltage to avoid derating of components. For example, many common capacitors derate over their life based on current spikes. For capacitors, such as electrolytic capacitors in a load power supply, the inrush current may momentarily present as a short-circuit condition to the component which stresses the component. Alternatively, if the current spikes are reduced to a smoother voltage profile they may derate slower and last longer.

FIG. 21 is an example of an inrush waveform 2100. When power is applied to the load an inrush 2110 typically occurs (e.g., see also inrush current 812 of FIG. 8) where the load demand greater power than when operating in a normal stable operating condition. This inrush at the initial connection of power may draw excessive power (thus wasting power) and may derate the electrical components of the load. Moreover, by controlling high inrush demands via the soft start feature, energy may be saved.

FIG. 22 is an example of a soft start waveform in comparison with an inrush waveform. Soft start waveform 2210 shows a gradual application of power to the load that reduces the inrush spike (shown in FIG. 22 as a dashed line and shown in FIG. 21 as inrush 2110). The soft start waveform 2210 shows a gradual application of power to the load (shown in FIG. 23B) that generally reduces the over-voltage and/or over-current conditions generally associated with application of power to certain loads. Because the maximum power applied using soft start waveform 2210 is less than the inrush power 2110, the electrical components of the load would derate slower and the overall lifetime of the electrical components may be extended.

FIG. 23A is an example of a typical AC power supply waveform 2300 where power is applied at activation time 2310 (also corresponding to activation time 510 of FIGS. 5 and 7).

FIG. 23B is an example of gradual clipping of an AC power supply waveform to achieve a soft start that reduces inrush. At activation time 2310, power is applied for a first portion 2330 of a first AC cycle. A the second half of the first AC cycle, power is applied for a second larger portion 2340 of the AC waveform In a first half of a second AC cycle, power is applied for a third larger portion 2350. In a second half of a second AC cycle, power is applied for a fourth larger portion 2360. In a first portion of a third AC cycle, power is applied for a fifth larger portion 2370. Thereafter, full power may be applied to the load.

In general, the gradual application of power achieves the soft-start system. Although only five increasing applications of power are show, the soft start feature may provide for gradual application of power over many AC cycles. Moreover, the application of power may be on the high side or the low side, or both (as shown), of the AC cycle. Thus, the soft start system as shown herein is an example of a soft start system and is not limiting.

Relating the gradual application of power from a small portion of full power to full power relates back to the stabilization period 820 shown in FIGS. 7 and 8. For example, the application of power at activation time 2310 may also relate with activation time 510 of FIGS. 5-8. Moreover, the various times of partial application of power (e.g., first portion 2330, second larger portion 2340, third larger portion 2350, fourth larger portion 2360, and fifth larger portion 2370) may be performed in the window of time shown in FIGS. 7 and 8 during the timer period defined by activation time 510 and stabilization end time 830. Application of full power may be before or at stabilization end time 830 (see FIGS. 7 and 8). Moreover, full power may be applied during sampling window 840 to avoid varying current consumption while sampling power demand.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system comprising:
    a sensor configured to determine whether a human is in the area of the sensor, said sensor providing a human-in-area signal when a human is determined to be in the area;
    a master power saving device configured for connection with a master load and configured to receive said human-in-area signal, said master power saving device configured to automatically determine when said master load is in an operating condition and a non-operating condition based on a load demand of the master load, and
    wherein said master power saving device provides non-continuous power to said master load when said master load is in a non-operating condition,
    wherein when said human-in-area signal is present, said power saving device employs a first strategy to make said determination of said operating condition of said master load and
    said power saving device employs a second strategy to make said determination of said operating condition of said master load when said signal is not received; and
    a slave power saving device configured for connection with a slave load, said slave power saving device configured to receive a master signal from said master power saving device to turn off said slave load when said master load is in said non-operating condition.

2. The system of claim 1, wherein said master power saving device communicates with said slave power saving device using power line communication.

3. The system of claim 1, wherein said master power saving device communicates with said slave power saving device using wireless communication.

4. The system of claim 1, wherein said slave power saving device is further configured to receive said signal from said master power saving device to turn on said slave load.

5. The system of claim 1, wherein said slave power saving device is further configured to determine when said slave load is in an operating condition and a non-operating condition, and wherein said slave power saving device provides non-continuous power to said slave load when said slave load is in a non-operating condition.

6. The system of claim 1, wherein said load demand comprises at least one of electrical current and power.

7. The system of claim 1, wherein said slave power saving device is paired with said master power saving device to receive said signal.

8. The system of claim 1, further comprising a plurality of slave power saving devices configured to receive said signal from said master power saving device.

9. A system comprising:
    a sensor configured to determine whether a human is in the area of the sensor, said sensor providing a signal when a human is determined to be in the area; and
    a power saving device configured to receive said signal, said power saving device configured for connection with a load, said power saving device configured to determine when said load is in an operating condition and a non-operating condition based on a load demand, and wherein said power saving device provides continuous power to said load when said load is in said operating condition and non-continuous power to said load when said load is in said non-operating condition, and
    when said load is in a non-operating condition said power saving device employs
    a first strategy to make said determination of said operating condition of said load when said signal is received and
    a second strategy to make said determination of said operating condition of said load when said signal is not received,
    wherein said first strategy comprises pulsing power having a first period to said load, said second strategy comprises pulsing power having a second period to said load, and said second period is longer than said first period.

10. The system of claim 9, wherein said sensor comprises a motion sensor.

11. The system of claim 9, wherein said sensor comprises at least one of a thermal sensor and a sound sensor.

12. The system of claim 9, wherein said first strategy increases a response time of said power saving device in relation to said second strategy.

13. The system of claim 9, wherein said second strategy decreases a response time of said power saving device in relation to said first strategy.

* * * * *